(12) United States Patent
Sun et al.

(10) Patent No.: US 11,570,147 B2
(45) Date of Patent: Jan. 31, 2023

(54) SECURITY CLUSTER FOR PERFORMING SECURITY CHECK

(71) Applicant: Nicira, Inc., Palo Alto, CA (US)

(72) Inventors: Keyong Sun, Beijing (CN); Yonggang Wang, Beijing (CN); Frank Guo, Beijing (CN); Liang Li, Beijing (CN); Zikang Chen, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 578 days.

(21) Appl. No.: 16/179,769

(22) Filed: Nov. 2, 2018

(65) Prior Publication Data

US 2019/0075079 A1    Mar. 7, 2019

Related U.S. Application Data

(63) Continuation of application No. 14/811,434, filed on Jul. 28, 2015, now Pat. No. 10,142,287.

(60) Provisional application No. 62/143,789, filed on Apr. 6, 2015.

(51) Int. Cl.
*H04L 12/24* (2006.01)
*H04L 29/06* (2006.01)
*H04L 9/40* (2022.01)
*H04L 69/22* (2022.01)
*H04L 9/32* (2006.01)

(52) U.S. Cl.
CPC .......... *H04L 63/0227* (2013.01); *H04L 63/20* (2013.01); *H04L 69/22* (2013.01)

(58) Field of Classification Search
CPC ...... H04L 63/0227; H04L 63/20; H04L 69/22

USPC .......................................................... 726/13
See application file for complete search history.

(56) References Cited

U.S. PATENT DOCUMENTS

| | | | | |
|---|---|---|---|---|
| 5,847,962 | A * | 12/1998 | LaDue | G06K 17/00 700/237 |
| 7,774,498 | B1 * | 8/2010 | Kraemer | H04L 63/20 709/224 |
| 9,130,869 | B2 | 9/2015 | Manghirmalani et al. | |
| 9,231,916 | B1 | 1/2016 | Kruglick | |
| 9,465,954 | B1 * | 10/2016 | Speedie | G06F 21/6227 |
| 9,930,010 | B2 | 3/2018 | Sun et al. | |
| 2003/0188192 | A1 | 10/2003 | Fang et al. | |
| 2003/0193912 | A1 | 10/2003 | O'Neill | |
| 2004/0085958 | A1 | 5/2004 | Oman | |
| 2006/0174337 | A1 | 8/2006 | Bernoth | |

(Continued)

*Primary Examiner* — Haresh N Patel
(74) *Attorney, Agent, or Firm* — Adeli LLP

(57) ABSTRACT

Some embodiments of the invention provide a method for a first security controller that performs security operations on the packets that are transmitted within a network. The method of some embodiments receives a packet from a forwarding element in the network based on a decision made by a security agent that operates along with the forwarding element. When the first security controller stores a security rule for the packet, the method processes the packet according to the stored security rule. When the first security controller does not store a security rule for the packet, the method (i) determines that a second security controller stores a security rule for the packet based on a set of header values of the packet, and (ii) sends the packet to the second security controller for security processing according to the security rule for the packet stored on the second security controller.

2 Claims, 13 Drawing Sheets

(56) References Cited

U.S. PATENT DOCUMENTS

| | | | |
|---|---|---|---|
| 2007/0234061 A1* | 10/2007 | Teo | G06F 21/566 713/178 |
| 2010/0080228 A1 | 4/2010 | Kwapniewski et al. | |
| 2010/0080233 A1 | 4/2010 | Kwapniewski et al. | |
| 2010/0095367 A1 | 4/2010 | Narayanaswamy | |
| 2010/0192218 A1 | 7/2010 | Shah et al. | |
| 2012/0069972 A1* | 3/2012 | Bennett, III | H04M 11/04 379/44 |
| 2013/0117429 A1 | 5/2013 | Koponen et al. | |
| 2013/0125230 A1* | 5/2013 | Koponen | H04L 41/08 726/13 |
| 2013/0208621 A1* | 8/2013 | Manghirmalani | H04L 45/44 370/254 |
| 2013/0291088 A1 | 10/2013 | Shieh et al. | |
| 2013/0304915 A1 | 11/2013 | Kawai | |
| 2013/0305311 A1* | 11/2013 | Puttaswamy Naga | H04L 63/20 726/1 |
| 2014/0026231 A1* | 1/2014 | Barak | G06F 9/45558 726/29 |
| 2014/0052836 A1 | 2/2014 | Nguyen et al. | |
| 2014/0082237 A1* | 3/2014 | Wertheimer | G06F 13/4022 710/104 |
| 2014/0247714 A1 | 9/2014 | Sonoda et al. | |
| 2014/0247753 A1 | 9/2014 | Koponen et al. | |
| 2014/0331274 A1 | 11/2014 | Bitton et al. | |
| 2015/0009796 A1 | 1/2015 | Koponen et al. | |
| 2015/0010000 A1 | 1/2015 | Zhang et al. | |
| 2015/0010012 A1 | 1/2015 | Koponen et al. | |
| 2015/0026794 A1* | 1/2015 | Zuk | H04L 63/0227 726/13 |
| 2015/0058968 A1* | 2/2015 | Wang | H04L 63/0281 726/12 |
| 2015/0103679 A1* | 4/2015 | Tessmer | H04L 43/0811 370/252 |
| 2015/0124595 A1 | 5/2015 | Yamagata et al. | |
| 2015/0172183 A1 | 6/2015 | DeCusatis et al. | |
| 2015/0172189 A1 | 6/2015 | Pitchai et al. | |
| 2015/0281048 A1 | 10/2015 | Agarwal et al. | |
| 2016/0065469 A1* | 3/2016 | Chanda | H04L 41/12 709/238 |
| 2016/0087887 A1* | 3/2016 | Fung | H04L 49/3009 370/401 |
| 2016/0094460 A1* | 3/2016 | Shelar | H04L 45/56 370/392 |
| 2016/0094643 A1* | 3/2016 | Jain | H04L 45/44 709/226 |
| 2016/0142285 A1 | 5/2016 | Lee et al. | |
| 2016/0226863 A1* | 8/2016 | Wotherspoon | G06Q 20/18 |
| 2016/0294776 A1 | 10/2016 | Sun et al. | |
| 2016/0294874 A1* | 10/2016 | Sun | H04L 63/0227 |

\* cited by examiner

SECURITY CLUSTER FOR PERFORMING SECURITY CHECK

CLAIM OF BENEFIT TO PRIOR APPLICATIONS

This application is a continuation application of U.S. patent application Ser. No. 14/811,434, filed Jul. 28, 2015, now published as U.S. Patent Publication 2016/0294776. U.S. patent application Ser. No. 14/811,434 claims the benefit of U.S. Provisional Patent Application 62/143,789, filed Apr. 6, 2015. U.S. patent application Ser. No. 14/811,434 is hereby incorporated by reference.

BACKGROUND

One of the most important challenges in today's computer networks (both public and private) is the network security. A good example of a private network is a hosting system network. Each host machine of a hosting system includes a hypervisor, which creates and runs a set of virtual machines for each tenant of the hosting system and presents the tenant's operating systems with a virtual operating platform that manages the execution of the tenant's operating systems. Each hypervisor of each host machine of the hosting system, however, performs security check on the data packets received by or sent out from the host machine separately. As an example, a particular virtual machine (VM), in a host machine, is assigned as a security VM to perform the necessary security checks on the packets that are exchanged with other VMs of the host machine. The security rules are configured in this particular security VM and all other VMs residing in the same host machine are protected by the security VM. The hypervisor of the host machine forwards the network traffic to the security VM first, and after the security VM performs the necessary security checks, the packets will be sent back to the hypervisor to be forwarded to their destinations.

Implementing the network security in this manner causes the network performance to be highly dependent on the performance of the security VM of each host machine. For instance, when the network traffic load is heavy, having one security VM to check the traffic would impact the network performance and introduce network latency. Additionally, each of the hypervisors of several host machines that host the VMs of the same tenant needs to deploy a separate security VM, while the security rules that are configured on these security VMs are all the same.

BRIEF SUMMARY

Some embodiments of the invention provide a distributed network security system for a network (e.g., a network in a datacenter). The system of some embodiments includes security agents that operate alongside forwarding elements (e.g., on the same physical machine as software forwarding elements) within the network, as well as security controllers from which the security agents learn security rules and to which the security agents offload certain operations. Specifically, in some embodiments, the security controllers store all of the various security rules for the network, and distribute these rules to the security agents as needed. In addition, for certain more processing-intensive operations (e.g., that involve packet inspection beyond the L4 headers), the security agents transmit the packets to the security controllers for the security controllers to perform these processing-intensive operations.

In some embodiments, the complete set of security rules for the network (determined, e.g., by a network administrator) is distributed across several security controllers in a security cluster. These security rules specify, for example, whether packets should be allowed or dropped, as well as whether packets should have additional security operations (e.g., antivirus or other deep-packet inspection (DPI) operations) performed. The security rules may identify packets based on single header fields (e.g., all packets with an Internet Protocol (IP) address of X) or numerous header fields (e.g., packets with a 5-tuple {source IP X, destination IP Y, source port M, destination port N, protocol TCP} of a data flow).

To distribute the rules across the security controllers, some embodiments use a sharding mechanism. Specifically, some embodiments generate a hash value for each security rule based on the header field values for which the rule is specified, and use these hash values to assign the security rule to one of the security controllers. For instance, some embodiments compute the result of the hash value modulo the number of security controllers, and assign the security rule based on this result.

The distributed network security system of some embodiments operates on all packets received at a forwarding element in the network. The forwarding elements, in some embodiments, are software forwarding elements (that operate, e.g., on the same physical host machine as the data compute nodes that send and receive the packets). When the forwarding element receives a packet, it passes the packet to its local security agent for processing. The security agent stores a set of rules for packets that it has already processed, learned from the security controller cluster. When the security agent has a rule for the current packet, the agent processes the packet according to the rule. This rule may specify to allow the packet, or to drop the packet. In some cases, the security rule specifies a particular one of the security controllers to which to send the packet for additional packet inspection. In this case, the forwarding element transmits the packet to the specified security controller (which is the security controller that has the particular security rule for the packet) for the additional security processing.

For the first packet of a data flow, however, the security agent will often not have a rule stored (unless there is a more coarse-grained rule that matches based on some, but not all, of the fields that define the data flow). In this case, each security agent in the network specifies a particular default controller to which to send packets that do not match any stored security rules. According to this rule, the forwarding element transmits the packet to the default security controller for that particular security agent.

When a security controller receives a packet from a security agent in the network, the security controller determines whether it is the appropriate security controller or whether the packet should be forwarded to a different one of the security controllers in the cluster. To make this determination, the security controller determines whether it has a security rule for the packet. When the packet is the first packet in a flow, and the security controller is the default controller specified to receive the packet, it may not have the security rule for the packet. However, as explained below, for subsequent packets, the correct security controller will have installed a rule on the security agent, which specifies the correct security controller to which to transmit the packet. If the security controller that receives the packet does not have the appropriate security rule, it identifies the correct security controller (by, e.g., generating a hash index for the packet and determining the controller to which the hash index corresponds) and sends the packet to this identified security controller.

When the security controller does have the security rule for the packet, it processes the packet according to the security rule. As mentioned, this may entail performing various types of deep-packet inspection operations that involve examining the packet payload (i.e., past the L4 headers). In some embodiments, the security agents send all packets requiring deep-packet inspection to the specified security controller.

When the packet is the first packet in a data flow (i.e., the first packet to be sent from a particular security agent for processing by a particular security rule), the security controller sends the packet back to the forwarding element with the rule for the local security agent. If no deep-packet inspection is required, the rule simply indicates, e.g., whether to drop or allow the packet at the security agent. In some embodiments, the controller does not send the packet back to the forwarding element if the rule is to drop the packet. In some embodiments, when further processing is required for the security rule, the rule also specifies the correct security controller to which to send further packets. Thus, even if the default controller for a particular local security agent is not the correct controller for a particular packet, subsequent packets in the same flow will be sent to the correct security controller.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
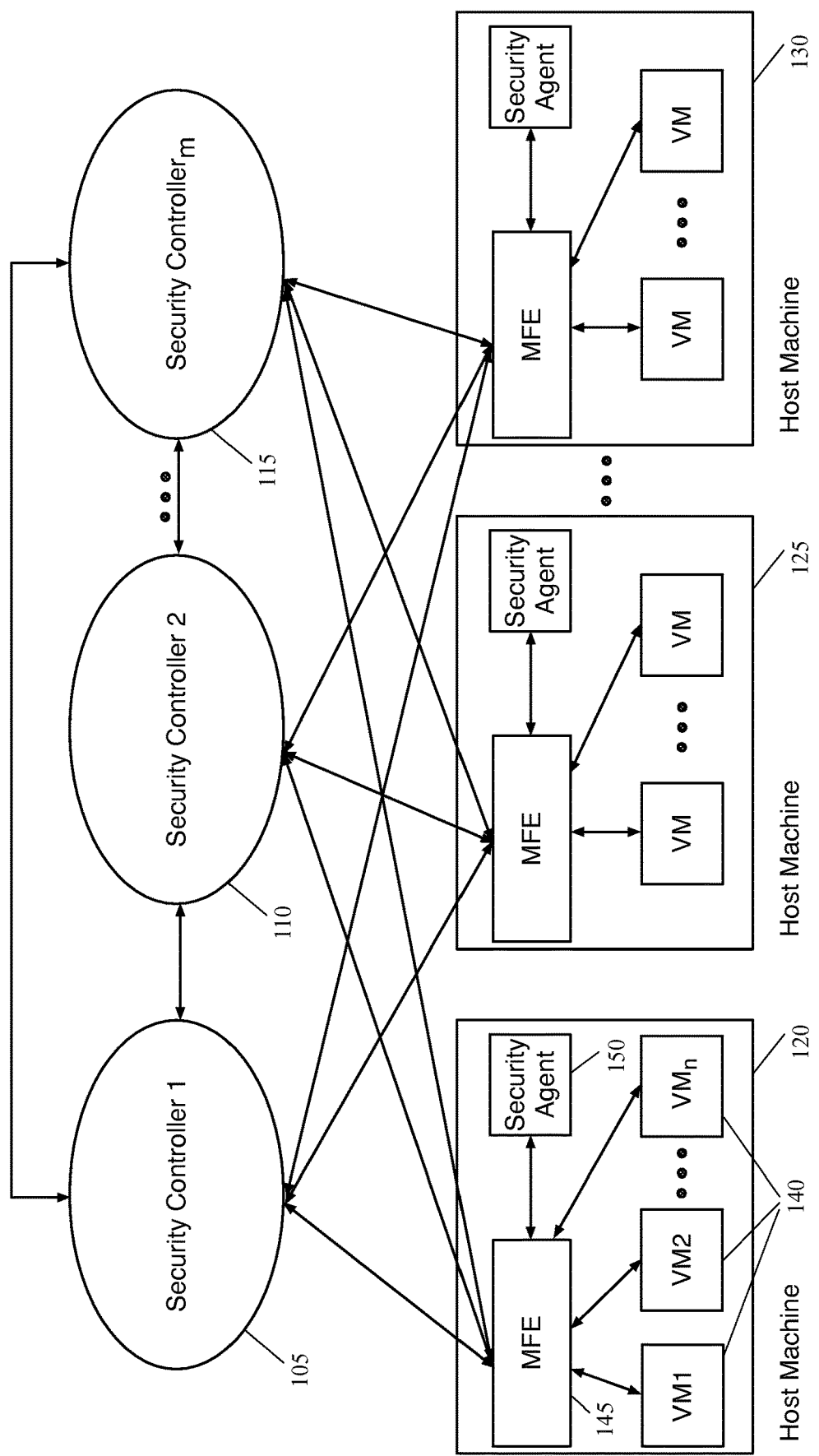
FIG. 1 illustrates a security cluster of some embodiments that performs security service for the host machines of a hosting system.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a distributed network security system for a network (e.g., a network in a datacenter). The system of some embodiments includes security agents that operate alongside forwarding elements (e.g., on the same physical machine as software forwarding elements) within the network, as well as security controllers from which the security agents learn security rules and to which the security agents offload certain operations. Specifically, in some embodiments, the security controllers store all of the various security rules for the network, and distribute these rules to the security agents as needed. In addition, for certain more processing-intensive operations (e.g., that involve packet inspection beyond the L4 headers), the security agents transmit the packets to the security controllers for the security controllers to perform these processing-intensive operations.

The security cluster of some embodiments receives network security configuration (e.g., from a network administrator) and configures a set of security controllers of the security cluster to perform network security for the hosting system. The hosting system, in some embodiments, includes multiple computing machines (e.g., host machines) that execute several compute nodes (e.g., virtual machines) for different tenants. The security controllers of some embodiments are controller computers, while in other embodiments, the security controllers are virtual machines that execute on one or more computing machines. In yet other embodiments, the security controllers are security controller instances that operate on one or more physical machines or compute nodes (e.g., end machines residing on a host machine).

In some embodiments, the complete set of security rules for the network (determined, e.g., by a network administrator) is distributed across several security controllers in the security cluster. These security rules specify, for example, whether packets should be allowed or dropped, as well as whether packets should have additional security operations (e.g., antivirus or other deep-packet inspection (DPI) operations) performed. The security rules may identify packets based on single header fields (e.g., all packets with an Internet Protocol (IP) address of X) or numerous header fields (e.g., packets with a 5-tuple {source IP X, destination IP Y, source port M, destination port N, protocol TCP} of a data flow). Each security controller of the security cluster is initially configured to provide security service to a particular set of host machines. In other words, each host machine of a particular set of host machines initially requests for a security rule from a particular controller of the security cluster.

After receiving the security configuration (e.g., from a user), some embodiments use a sharding mechanism to distribute the rules across the security controllers of the security cluster. Specifically, some embodiments generate a hash value for each security rule based on the header field values for which the rule is specified, and use these hash values to assign the security rule to one of the security controllers. For instance, some embodiments compute the result of the hash value modulo the number of security controllers, and assign the security rule based on this result.

In some embodiments, a security agent operating on the host machine sends the packets to a security controller associated with the security agent to perform security check on the packets. The security agent of some embodiments is a software instance implemented in the hypervisor of a host machine. In other words, each host machine of the hosting system has a security agent instantiated in the hypervisor of the host machine. Therefore the security agent is able to efficiently inspect the network traffic received by or transmitted out of the host machine. In other words, the security agent inspects both the incoming traffic that is destined for any of the end machines residing on the host machine, and the outgoing traffic that is transmitted out by the end machines. Additionally, the network agent of some embodiments inspects the network data that is exchanged between the end machines of the same host machine.

The term "packet" is used above as well as throughout this application to refer to a collection of bits in a particular format sent across a network. It should be understood that the term "packet" may be used herein to refer to various formatted collections of bits that may be sent across a network, such as Ethernet frames, TCP segments, UDP datagrams, IP packets, etc.

Each security agent has an associated local data structure that stores the security rules for the packets that the security agent has already processed. In some embodiments, when the security agent is initially instantiated in the hypervisor, there is only one default rule stored in such a data structure. The default rule, in some embodiments, indicates which security controller in the security cluster is responsible (i.e., is a default controller) to perform an initial security check on the packets received from the security agent. Therefore, in some such embodiments, for each packet that was not previously processed by the security agent, the default rule directs the security agent to send the packet to the default security controller. After the security controller processes the packet, the security agent receives the security rule, with which the packet is processed, from the security controller and stores the rule in the local data structure. This way, for any following packet that belongs to the same data flow, or alternatively shares at least one common characteristic with the processed packet, the security agent does not have to send the packet to the associated security controller for further processing. In some embodiments the security controller does not send the packet back to the security agent when the rule is to drop the packet.

FIG. 1 illustrates a security cluster of some embodiments that performs security service for the host machines of a hosting system. More specifically, this figure shows a set of security controllers 105-115 of a security cluster that perform security check for a set of host machines 120-135 of a hosting system. Each host machine of the hosting system includes a set of compute nodes 140 (e.g., end machines), a managed forwarding element 145, and a security agent 150 (other elements operating on the host machines are not shown for simplicity of the description).

In some embodiments, the managed forwarding element 145 of a host machine 120 implements a set of logical forwarding elements (not shown) that logically connect one or more of the end machines 140 which reside on the same host machine 120 to end machines residing on other host machines in the datacenter, as well as (in some cases) to networks external to the datacenter. The logical forwarding elements that logically connect the end machines, in some embodiments, define a logical network topology for a tenant of a datacenter. In some embodiments, the logical network is implemented in a distributed, virtualized fashion. The various end machines of the logical network may be implemented as virtual machines hosted on numerous different physical host machines, although in other embodiments some or all of the machines in the network are physical machines themselves. The logical forwarding elements (e.g., logical switches, logical routers, etc.) of some embodiments are distributed across and implemented by numerous managed forwarding elements operating on numerous physical machines that also host the end machines (e.g., virtual machines) of the logical network.

In some embodiments, a managed forwarding element runs on each of the host machines of the hosting system, in order to implement the logical forwarding elements (e.g., logical routers, logical switches) of the logical network. As a particular physical host machine may host virtual machines of more than one logical network (e.g., belonging to different tenants), the managed forwarding element running on the host machine may be virtualized in order to implement logical forwarding elements from different logical networks.

Accordingly, the managed forwarding element (MFE) 145 processes logical network packets sent to and from the end machines of the logical network that reside on its host 120. Thus, each incoming packet for the host machine 120 that is destined for any of the end machines 140 and each outgoing packet that is transmitted from any of the end machines to another network element outside the host machine 120 passes through the MFE 145.

In some embodiments, the managed forwarding element of a host machine sends each packet that it receives to a security agent 150 operating on the same host machine (e.g., deployed in the hypervisor of the host machine). The security agent 150 of some embodiments is configured to send the packets, for which it does not have a corresponding security rule, to an associated security controller (e.g., a default security controller) that is responsible for performing an initial security check on the packets received from the security agent. More specifically, when the security agent is instantiated in the hypervisor of the host machine, the security agent is configured to have a default rule for any packet for which the security agent does not have a security rule. The default rule directs the security agent to forward the packet to its associated default security controller.

Therefore, the security agent 150, after receiving a packet from the MFE 145, first determines whether it has a security rule for the received packet. The security rules in some embodiments include allowing the packet, dropping the packet, blocking the packet, or sending the packet for deep-packet inspection (DPI) to a corresponding security controller in the security cluster. If the security agent 150 does not have a rule for the received packet (e.g., the packet is a first packet of a data flow), the security agent transmits the packet to the associated security controller based on the default rule configured in the security agent. For instance, in the illustrated example, the security controller 105 is the controller that the default rule indicates as the responsible controller for the security agent 150. This controller is also responsible to perform the initial security check on packets received from the security agent of the host machine 125, whereas security controller 115 performs the initial security check on the packets received from the security agent of the host machine 130 (these relationships between the security agents and the security cluster are not shown in the figure for simplicity of description). In other words, the security controller 105 is a default security controller for the security agents of the host machines 120 and 125, while the security controller 115 is the default security controller for the security agent of the host machine 130.

As stated above, each of the security controllers 105-115 stores a different set of security rules in its corresponding security rules database shard. In some embodiments, a network administrator of the hosting system configures the security controllers by adding or updating the security rules in the security controllers. Some embodiments create the security rules database and shards the database between the security controllers after the initial security configuration.

When the security agent 150 of the host machine 120 receives a packet from the managed forwarding element, the security agent first identifies the packet. The security agent of some embodiments identifies the packet by extracting the packet's identification information from one or more packet headers (e.g., the Internet Protocol (IP) header, the Transmission Control Protocol (TCP) header, etc.). In some embodiments these identification information include any combination of the five-tuple of the packet (i.e., source IP address, destination IP address, source transport port number, destination transport port number, and transport protocol). For example, the identification information may include only the source IP of the packet, or the destination IP of the packet, or the whole five-tuple of the packet.

After identification of the packet, the security agent determines whether any combination of the five-tuple of the packet is among the existing packet identification fields that the security agent has already processed and stored (e.g., in a local rules table). In some embodiments a particular packet can be identified by multiple records in the rules table. For example, a record of the rules table might indicate that all packets with a source IP that has the address X should be allowed. At the same time, another record of the rules table might indicate that all packets with source IP of X and destination IP of Y should be dropped.

In some embodiments when there are multiple records in the rules table that identify the same packet, a record that has a more general identification value for a packet in the packet identification field would be assigned a higher priority over other records that identify the same packet. That is, the record that has a packet identification field with only one of the five-tuple of the packet has a higher priority than a record with two or more of the five-tuple of the packet in the packet identification field. Therefore in the aforementioned example, the packet that has the source IP of X and the destination IP of Y would be allowed by the security agent of some such embodiments because a rule of the rules table indicates that all packets with source IP address of X should be allowed.

In some other embodiments, however, when there are multiple records in the rules table that identify the same packet, a record that has a more specific identification value for a packet in the packet identification field would be assigned a higher priority over other records that identify the same packet. That is, the record that has a packet identification field with a combination of maximum number of the five-tuple has a higher priority than a record with a less number of the five-tuple of the packet in the packet identification field. Therefore, according to these embodiments, in the above example, the packet that has the source IP of X and the destination IP of Y would be dropped by the security agent even though a record of the rules table indicates that this packet should be allowed. In yet some other embodiments, the priority of the records can be assigned and/or updated (e.g., by a user). For instance, a user of some embodiments can assign different priorities to different records that share some characteristics of a packet.

When the security agent of some embodiments identifies the packet and realizes that there is no existing rule in the rules table of the security agent for the packet, the security agent processes the packet according to a default rule that is configured in the security agent. In the illustrated example, the default rule directs the security agent 150 of the host machine 120 to send the packet to the security controller 105. As stated above, the security controller then identifies the packet (e.g., in the same manner as described above for the security agent) and tries to find a corresponding rule for the packet. When the rule is found in the security rule database shard of the security controller, it processes the packet based on the rule and sends the rule back to the requesting security agent. In some embodiments, if the found rule is to allow the packet, the security controller sends the packet along with the rule to the requesting security agent. On the other hand, when the security controller does not find the rule, it determines what other security controller of the security cluster has the rule, and sends the packet to that controller for further processing.

It should be understood that not in all embodiments the packets are exchanged between the managed forwarding elements and the controllers of the security cluster, as shown in this figure and some of the following figures. For example, in some embodiments, the security agents pass the packets to the security controllers for security checking directly. In other words, the exchange of packets, in some such embodiments, occurs directly between the security agents and the security controllers of the security cluster.

Performing security check on the network data in a hosting system of some embodiments is described above. The following sections describe such security processing in several more detailed embodiments. Section I describes security processing performed by security agents of some embodiments. Next, Section II describes configuring a security cluster to perform security check for a hosting system. Finally, Section III describes an electronic system with which some embodiments of the invention are implemented.

I. Security Agent

The distributed network security system of some embodiments operates on all packets received at a forwarding element in the network. The forwarding elements, in some embodiments, are software forwarding elements (that operate, e.g., on the same physical host machine as the data compute nodes that send and receive the packets). When the forwarding element receives a packet, it passes the packet to its local security agent for processing. The security agent stores a set of rules for packets that it has already processed, learned from the security controller cluster. When the security agent has a rule for the current packet, the agent processes the packet according to the rule. This rule may specify to allow the packet, or to drop the packet. In some cases, the security rule specifies a particular one of the security controllers to which to send the packet for additional packet inspection. In this case, the forwarding element transmits the packet to the specified security controller (which is the security controller that has the particular security rule for the packet) for the additional security processing.

For the first packet of a data flow, however, the security agent will often not have a rule stored (unless there is a more coarse-grained rule that matches based on some, but not all, of the fields that define the data flow). In this case, each security agent in the network specifies a particular default controller to which to send packets that do not match any stored security rules. According to this rule, the forwarding element transmits the packet to the default security controller for that particular security agent.

The security agent of some embodiments is a software instance implemented in the hypervisor (or other virtualization software) of the host machine. In other words, each host machine of the hosting system has a security agent instantiated in the hypervisor of the host machine. Therefore the security agent of each host machine is able to efficiently inspect the network traffic received by or transmitted out of the host machine. In other words, the security agent inspects both the incoming traffic that is destined for any of the end machines residing on the host machine, and the outgoing traffic that is transmitted out of the host machine from the end machines. Additionally, the network agent of some embodiments inspects the network data that is exchanged between the end machines of the same host machine.

Each security agent of some embodiments is associated with a local data structure (e.g., a rules table) that stores the security rules for the packets that the security agent has already processed. In some embodiments, when the security agent is initially instantiated in the hypervisor, there is only one default rule stored in such a data structure. The default rule, in some embodiments, indicates which security controller in the security cluster is the default security controller to perform an initial security check for the associated security agent. Therefore, in some such embodiments, for each packet that was not previously processed by the security agent, the default rule directs the security agent to transmit the packet to the associated default security controller. Some embodiments purge the data structure that stores the security rules for the security agent periodically in order to ensure that this data structure contains the latest updated security configuration information.

After the security controller processes the packet, the security agent receives the security rule with which the packet is processed from the security controller and stores the rule in its associated local data structure. This way, for any following packet that belongs to the same data flow, or alternatively shares a common characteristic with the processed packet, the security agent does not have to send the packet to the associated security controller for further processing. In some embodiments the security controller does not send the packet back to the security agent when the rule is to drop the packet. Additionally, in some embodiments the rules table of the security agent gets purged periodically in order to ensure that this table contains the latest updated security configuration information.

The security agent of some embodiments first determines whether a rule for processing the packet is stored locally (e.g., stored in an associated data structure on the host machine). The security agent makes such a determination before sending the packet for security check to the security controller. When the security agent determines that the required rule exists, the security agent processes the packet based on the existing security rule. The security rules in some embodiments include allowing the packet, dropping the packet, blocking the packet, or sending the packet for deep-packet inspection (DPI) to a corresponding security controller in the security cluster.

Figure 2:
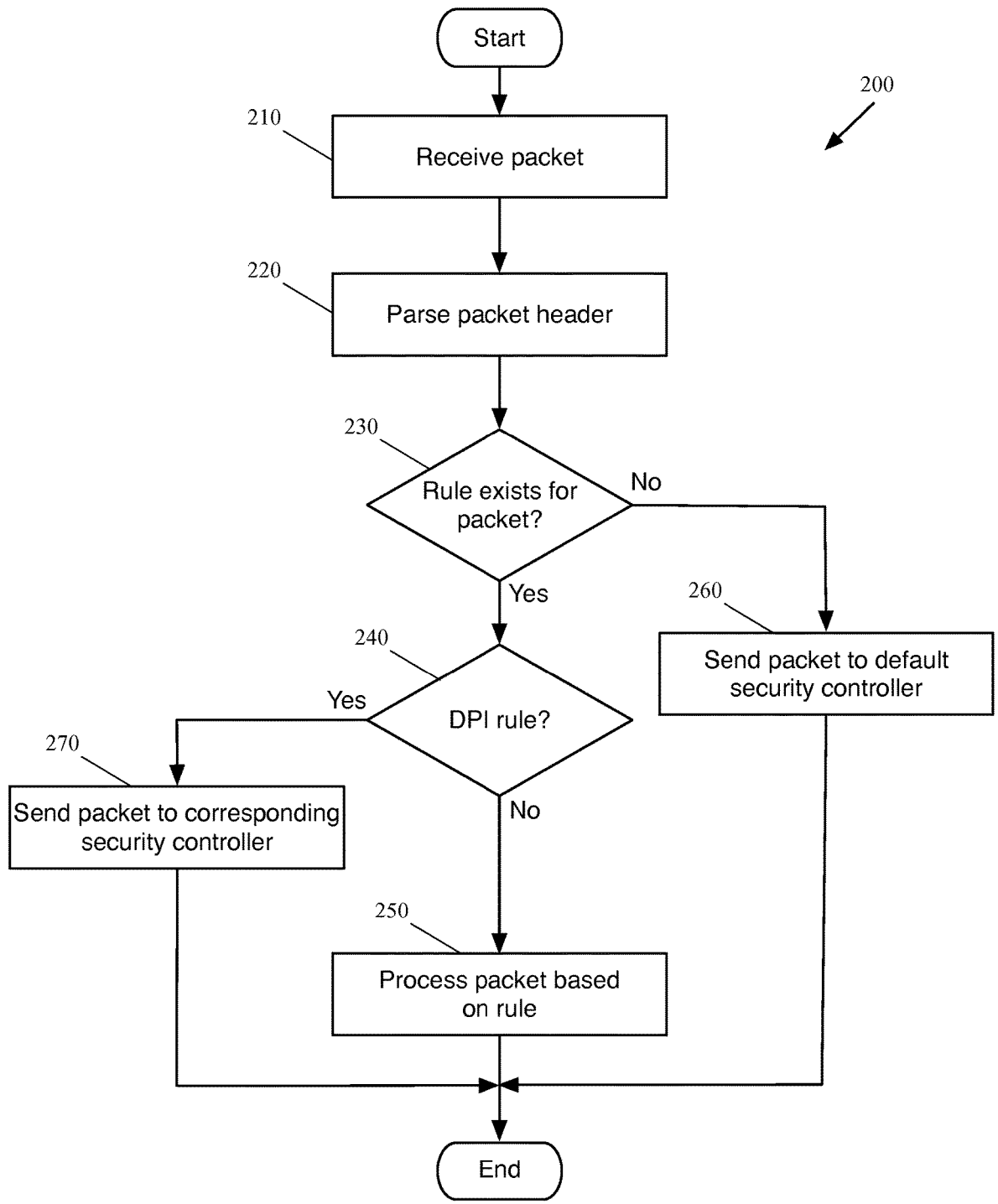
FIG. 2 conceptually illustrates a process of some embodiments that performs security check in a host machine of a hosting system.

FIG. 2 conceptually illustrates a process 200 of some embodiments that performs security check in a host machine of a hosting system. The process 200 of some embodiments is performed by a security agent that operates on each host machine of the hosting system. The process 200 begins by receiving (at 210) a packet on which a security check is required. As stated above, each host machine executes a forwarding element (e.g., an MFE) that exchanges packets with the end machines residing on the host machine as well as other managed forwarding elements that operate on other host machines of the hosting system.

In some embodiments, the security agent receives the packets from the MFE that operates on the host machine. After receiving the packet, the process parses (at 220) the packet headers in order to identify the packet. The process of some embodiments parses the packet headers by extracting the packet's identification information from one or more packet headers that contain different data for different network layers. For example, the process identifies the five-tuple of the packet by extracting the source and destination IP addresses, the source and destination transport port numbers, and the transport protocol information from the IP header and the TCP header of the packet. The process might also parse data link layer headers to identify, e.g., the MAC address and/or VLAN of a packet.

The process 200 then determines (at 230) whether the process has previously stored a rule for the identified packet in a corresponding local data storage (e.g., a rules table). In some embodiments, each security agent has a corresponding rules table that each of its records includes at least two fields: an identification field, and a rule field. The identification field contains identification information of different packets belonging to different data flows. The rule field contains the corresponding rule based on which the identified packet should be processed. In order to realize whether there is a corresponding rule for the received packet, the process of some embodiments searches the rules table (i.e., the identification filed of the table) for packet's identification information (i.e., any combination of the five-tuple of the packet). For example, the identification information may include only the source IP address of the packet, the destination IP address of the packet, or the five-tuple of the packet. If the process finds a matching record, the process realizes that the packet could be processed either at the host machine or at a particular security controller of the security cluster based on the identified security rule.

In some embodiments, a particular packet, however, might be identified in multiple records of the rules table. When there are multiple records in the rules table that contain different combinations of the five-tuple of the same packet, a record that has a more general identification value for the packet in the packet identification field would be assigned a higher priority over other records that identify the same packet. That is, in some embodiments, the record that has a packet identification field with only one of the five-tuple of the packet has a higher priority than another record that contains two or more of the five-tuple of the packet in the packet identification field. In some other embodiments, which are usually the default embodiments, when there are multiple records in the rules table that identify the same packet, a record that has a more specific identification value for a packet in the packet identification field would be assigned a higher priority over other records that identify the same packet. That is, the record that has a packet identification field with a combination of maximum number of the five-tuple has a higher priority than a record with a less number of the five-tuple of the packet in the packet identification field. In yet some other embodiments, the priority of the records can be assigned and/or updated (e.g., by a user). For instance, a user of some embodiments can assign different priorities to different records that share some characteristics of a packet.

When the process 200 determines that there is no existing rule (i.e., no record is found in the rules table of the security agent), the process transmits (at 260) the packet to a default security controller in the security cluster for further processing of the packet. The process then ends. As stated above, when the security agent is initially configured in the host machine (e.g., in the hypervisor of the host machine), a default rule is added to the rules table of the security agent. The default rule, in some embodiments, indicates which security controller in the security cluster is the default security controller for the security agent to perform initial security check on the packets received from the security agent. The security agent sends the packet, for which no rule has been found, to the default security controller of the security cluster based on the default rule.

On the other hand, when the process 200 finds a security rule for the received packet, the process determines (at 240) whether the rule is a deep-packet inspection (that requires inspection of the packet payload in addition to the packet headers) or another type of rule. Since deep-packet inspection (e.g., virus detection, spam detection, etc.) requires higher data processing power and storage, some embodiments send packets that require DPI to a specific security controller of the security cluster that the rule indicates. Therefore, when the process 200 determines that the rule is a DPI rule, the process transmits (at 270) the packet to the security controller specified in the rule. The process then ends. Specifying a particular security controller for DPI processing of a particular packet is described in detail below in Section II.

When the process determines (at 240) that the rule that the process has found for the packet is not a DPI rule, the process performs (at 250) a security check on the packet. That is, the security agent processes the packet according to the security rule that is found in the rules table. At this stage, the process either allows the packet (i.e., transmits the packet back to the MFE to be forwarded towards the packet's destination), drops the packet (i.e., does not transmit the packet back to the MFE), or blocks the packet (i.e., does not transmit the packet back to the MFE but sends a message (e.g., an ICMP) back to the MFE to be forwarded to the originator of the packet).

Some embodiments perform variations of the process 200. The specific operations of the process 200 may not be performed in the exact order shown and described. For example, the process of some embodiments does not transmit the packet to a security controller of the security cluster when the process determines that no record for the identified packet exists in the rules table. Instead, the process of some embodiments sends the identification information of the packet to the associated controller and receives a rule back from the controller. The process of some such embodiments then processes the packet according to the received rule. Additionally, in some embodiments, the process stores the rule that it receives from a security controller in the rules table after the process sends the packet for further processing to the default security controller. The process of some such embodiments, first determines whether a rule has been sent by the security controller to the security agent, and then stores the received rule. Additionally, the specific operations may not be performed in one continuous series of operations, and different specific operations may be performed in different embodiments.

Figure 3:
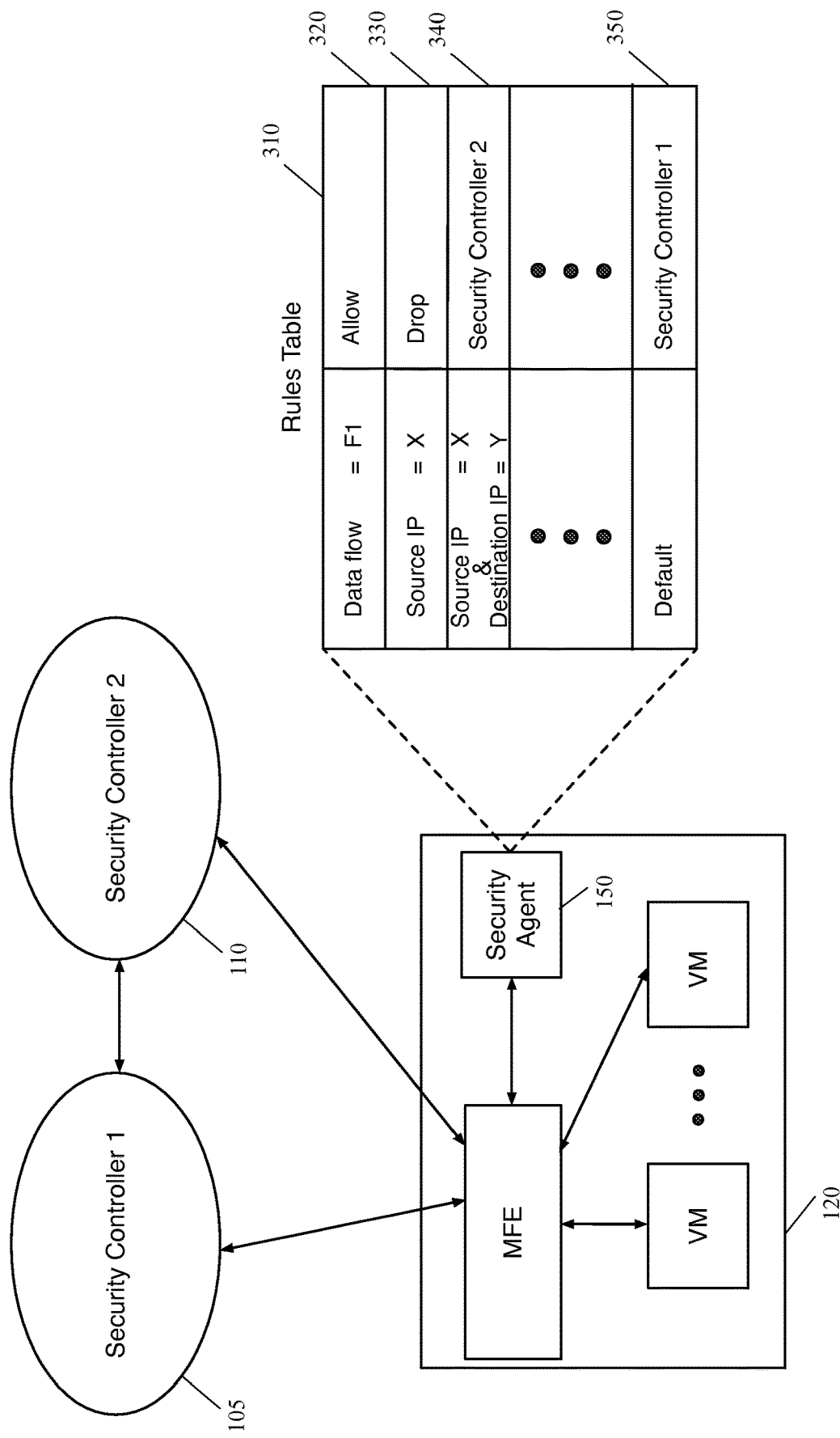
FIG. 3 illustrates an example of a rules table of some embodiments and the type of information stored in several records of the rules table.

FIG. 3 illustrates an example of a rules table of some embodiments and the type of information stored in several records of the rules table. This figure includes a set of security controllers 105-115 of a security cluster and a host machine 120 of a hosting system. As described in FIG. 1, the host machine 120 includes a set of compute nodes (e.g., end machines), a managed forwarding element, and a security agent 150 (other elements of the host machines are not shown for simplicity of the description). FIG. 3 also shows a rules table 310 that is associated with the security agent 150. The rules table 310 illustrated in the figure, includes a set of records 320-340 and a default rule record 350 among several other records.

As stated above, each security agent has an associated rules table that is stored locally in the host machine. In some embodiments, the security rules table 310 includes at least two columns (fields): an identification column, and a rule column. The identification field contains identification information of different packets belonging to different data flows. The rule field contains the corresponding rule for each identification field based on which the identified packet should be processed. In order to realize whether there is a corresponding rule for a received packet, the security agent searches for the packet's identification information (i.e., any combination of the five-tuple of the packet) in the identification filed of the rules table.

As shown in the figure, the identification field of the first record 320 of the rules table 310 contains "Data flow=F1." The rule field of the same record of the rules table contains "Allow." This tells the security agent to allow each packet that it receives (e.g., from the MFE) and has a five-tuple of data flow F1. It should be understood that the letter F1 shown in the figure is not a real single value that presents a combination of the five-tuple of the packet. Instead, it is used merely as an illustrative symbol, which indicate that the source and destination IP addresses of the packet should be the same as the source and destination IP addresses included in F1. Additionally, the source and destination transportation port numbers and the transportation protocol must be the same as the source and destination transportation port numbers and the transportation protocol included in F1.

The identification field of the second record 330 of the rules table 310 includes "Source IP=X," and its rule field includes "Drop." This record directs the security agent to drop any packet with a source IP address of Y. As stated before, it is possible that the source IP address in the five-tuple of F1 (indicated in the first record 320) is the same source IP address of X. This indicates that at least two records of the rules table 310 are capable of identifying the same packet that has a source IP of X as well as other four-tuple of F1. As stated above, different embodiments process a packet that can be identified by multiple records of the rules table differently. In some embodiments the identification fields that contain more general packet identification information have higher priorities compare to other identification fields with more specific identification information. In these embodiments, the packet with source IP address of X is always dropped by the security agent even if the five-tuple of the packet is F1. In other embodiments, in which the more specific packet identification information has a higher priority than more general identification information, the packet with five-tuple of F1 is always allowed even if the source IP address of the packet is X.

The identification field of the third record 340 of the rules table 310 includes "Source IP=X & destination IP=Y," and its rule field includes "Security Controller 2." This record directs the security agent to transmit any packet that has a source IP address of X and a destination IP address of Y to the security controller 110. Although the security controller 110 is not the default security controller for providing the security rules to the security agent 150, still the security agent is directed to send the packet with the aforementioned identification information to this security controller. This is because the security controller 110 is the controller that is configured to perform DPI processing for the security agent 150 of the host machine 120, on the packets that have source IP address of X and destination IP address of Y. It will be described in more detail below in Section II, how a rule in the rules table can be configured to direct the security agent to send the packet to a particular controller for DPI processing. Again, it is important to note that a packet with the source IP address of X can be identified by both of records 330 and 340 of the rules table. Depending on the embodiment though, the packet would be processed either by the more general identification field stored in the record 330, or by the more specific identification field stored in the record 340.

As stated above, the security rules of each security agent are provided by a particular security controller (i.e., the default controller) in the security cluster, which provides security service to a set of other security agents as well. In order for the security agent to know which security controller in the security cluster is the provider of its security rules, some embodiments define a default rule for the security agent, which identifies the default security controller. In some such embodiments, when the security agent is instantiated in the host machine (e.g., in the hypervisor of the host machine), the default rule is configured in the rules table of the security agent. In this manner, each packet that has not been previously processed by the security agent is directed to a default security controller that is identified by the default rule. In the illustrated example, the last record 350 of the table contains the default rule, which identifies the security controller 105 as the security controller configured to provide the security rules to the security agent 150.

In some embodiments, after the security agent 150 sends a packet to the security controller (e.g., a packet that the agent has not previously processed), the security agent will receive the packet back from the security controller 105 along with the record based on which the packet was processed in the security controller (i.e., the record that includes the identification information of the packet and the corresponding rule). In some such embodiments, the security agent stores the received identification information and its corresponding rule as a new record in the rules table 310. The identification information, as discussed above, can be the whole five-tuple of the packet or any combination of the five-tuple of the packet depending on what is configured in the default security controller (or any other security controller of the security cluster that has the rule for the identified packet).

Figure 4:
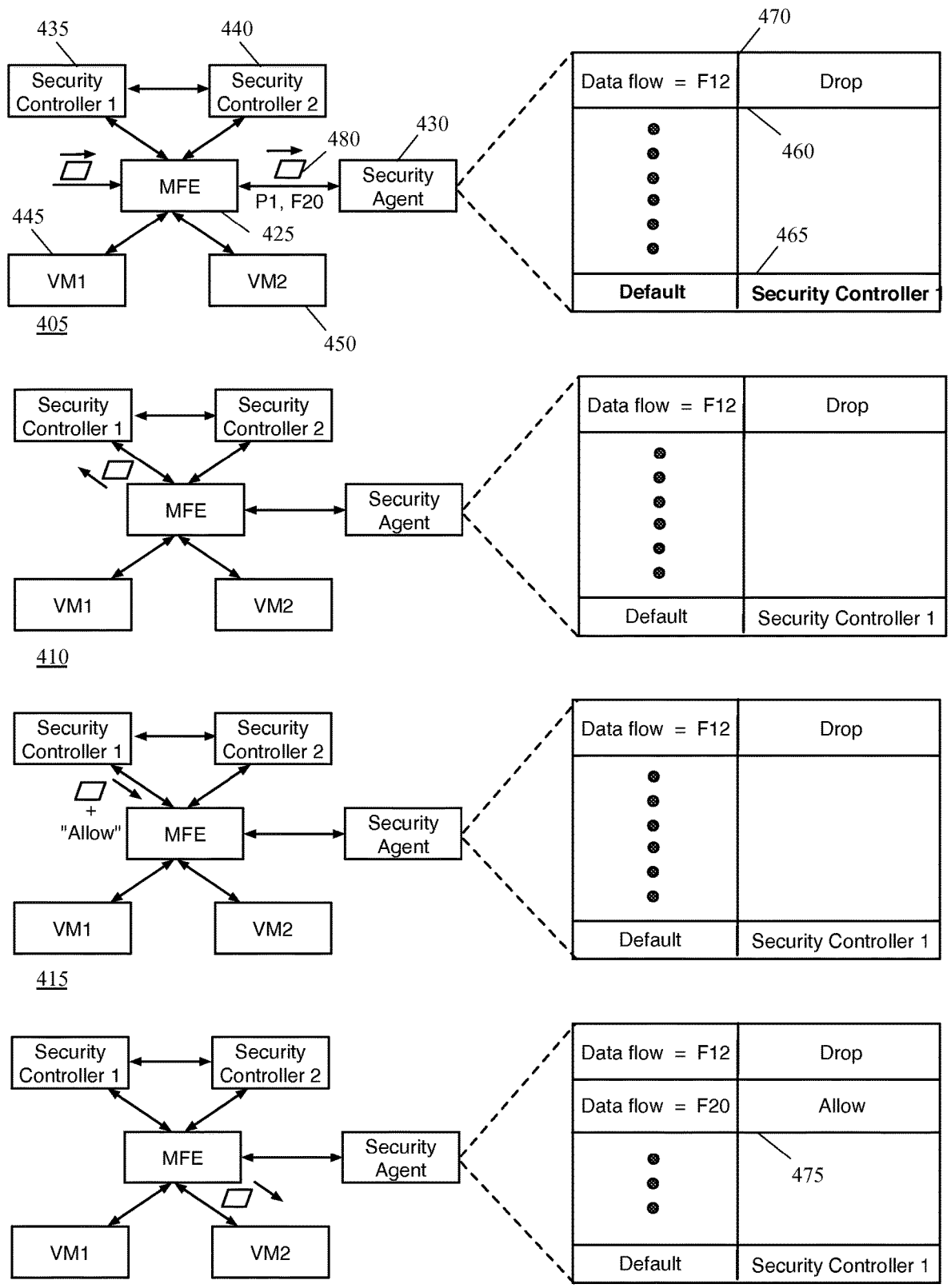
FIG. 4 illustrates an example of a security agent updating the security rules table associate with the security agent.

FIG. 4 illustrates an example of a security agent of some embodiments updating the security rules table that is associated with the security agent. More specifically, FIG. 4 illustrates, in four different stages 405-420, how the security agent of some embodiments updates the rules table associated with the security agent when the security agent receives a packet, for which the rules table doesn't have a security rule. The figure includes a managed forwarding element 425, a security agent 430, two security controllers 435 and 440, and two end machines 445 and 450. The rules table 470 currently has a default rule 465, among other rules, that indicates the security controller 435 is responsible for the initial security services of the security agent 430. There are also a few other records that are currently stored in the rules table 470 including a record 460 that indicates that each packet of the data flow F12 (i.e., a data flow which has the same five-tuple of F12) should be dropped.

The first stage 405 illustrates that the security agent 430 receives a packet 480 from the managed forwarding element 425. As shown, this packet is received by the MFE from none of the end machines operating on the host machine which shows that the packet is an incoming packet that the host machine, on which the MFE and security agent run, has received. The received packet is destined for one of the end machines 445 or 450 residing on the host machine. The packet 480 might as well be a packet that one of the end machines 445 or 450 has transmitted to be sent to the other end machine residing on the same host machine or any other network element outside the host machine. Regardless of where the packet is originated, the packet is required to be checked by the security agent 430 of the host machine. The first stage 405 also shows that the packet 480 is the first packet (P1) of a data flow F20.

In the second stage 410, after the security agent 430 has received the packet 480, the security agent searches the rules table for packet 480's identification information (i.e., any combination of the five-tuple of the packet in the data flow F20) in the identification column of the rules table. When the security agent 430 does not find any match in the rules table, the security agent follows the default rule of the table. As shown in this stage, the default rule is to transmit the packet to the security controller 435, because this controller of the security cluster is responsible for the initial security services of the host machine on which the security agent 430 operates. As the figure shows at this stage, the MFE 425 transmits the packet 480 to the security controller 435 for further security processing. It must be noted that some of the exchanges of the packets between the MFE and the security agent are not shown at every stage of the figure merely to reduce the number of stages in the figures and to simplify the description. For instance, before the MFE transmits the packet to the security controller, the transmission of the packet from the security agent back to the MFE is not shown as a separate stage in order to simplify the illustration as well as the description.

The third stage 415 shows that the security controller 435 has found a new rule for the packet and processed the packet based on the new rule (as will be described further below in Section II). This figure also shows that the security controller 435 sends the packet back to the MFE along with the new rule to be sent to the security agent 430. As stated above, the controller of some embodiments does not send the packet back to the security agent every time that the security controller sends a rule to the security agent. In some embodiments, the security controller sends that packet back along the rule only when the rule is a type of rule that requires the packet to be sent back to the security agent for further processing. For example, when the security rule is "allow" or when the security rule is "DPI" and the packet is not dropped based on such DPI, the packet will be sent back to the security agent.

The fourth stage 420 illustrates that the security agent has updated the rules table 470 with a new record 475 that indicates any packet that belongs to data flow F20 should be allowed (i.e., should be transmitted to the packet's destination). As discussed above, the identification field of the new rule in the record 475 does not necessarily have to include the whole five-tuple specified in the data flow (i.e., data flow=F20). The rule that the security agent receives from the security controller might include only a source IP address in the identification field. That is, the security controller 435 might find a rule (e.g., in the security rules database that is stored at this security controller) that only has the source IP address of the packet 480. Consequently, the security controller may return a rule that indicates any packet that shares the source IP address of the packet 480 should be allowed. As stated before, in some embodiments, when the rule is to allow the packet, the security controller sends the packet back to the security agent so that the packet could be forwarder towards its destinations. The fourth stage 420 also shows that the packet 480 is being forwarded towards the end machine 450 (as the destination of the packet) that resides in the same host machine.

Figure 5:
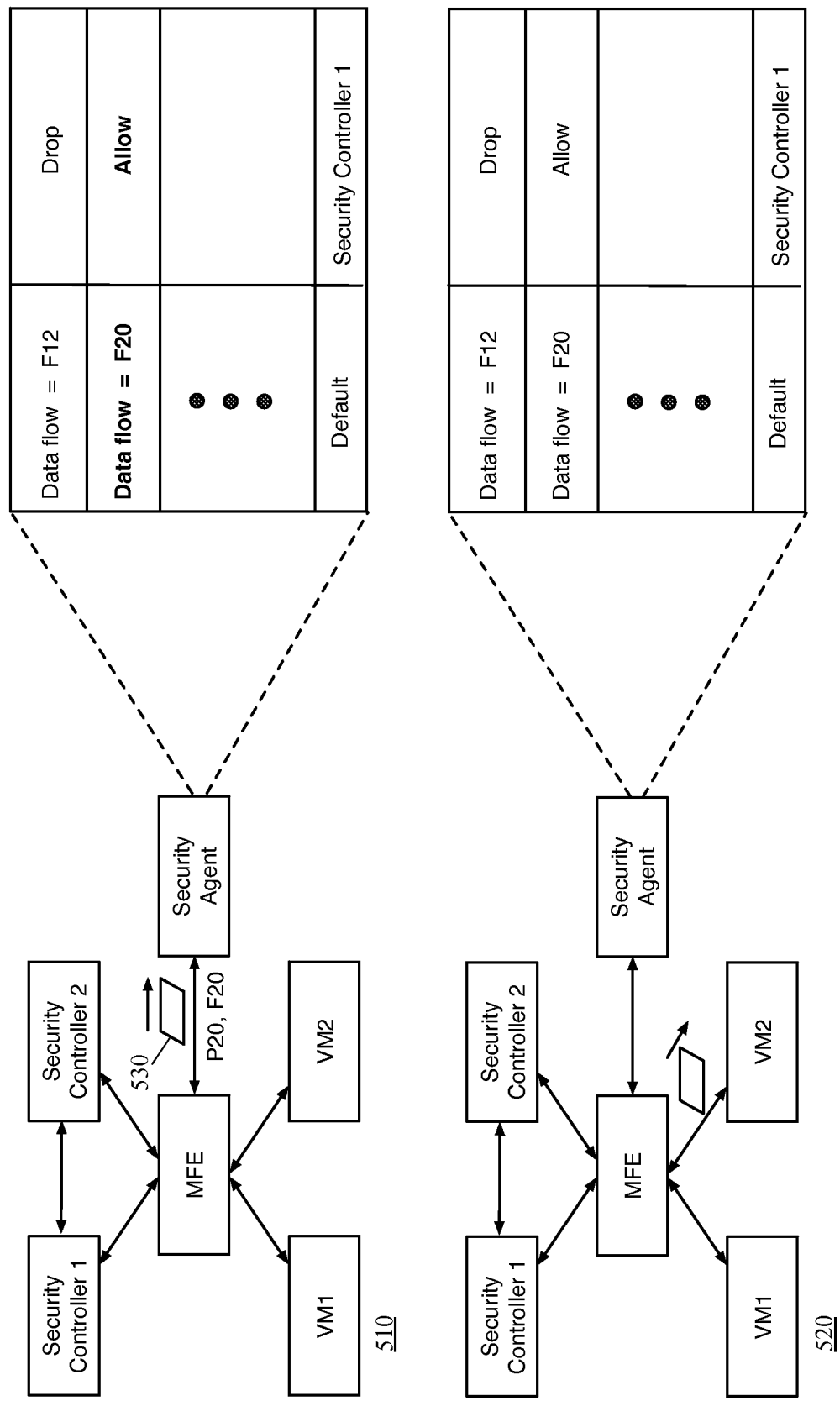
FIG. 5 illustrates the security agent processing a packet that it receives based on a security rule that the security agent finds in its rules table.

FIG. 5 illustrates an example of the security agent of some embodiments processing packets according to the security rules of the rules table. More specifically, FIG. 5 shows, in two stages 510 and 520, how the security agent processes a packet that it receives based on a security rule that the security agent finds in its rules table. As shown in the first stage 510, the security agent 430 receives a packet 530 from the managed forwarding element 425. This stage also shows that the packet 530 is the 20$^{th}$ packet (P20) of the data flow F20. The data flow F20 is the same data flow for which the security agent updated the rules table in FIG. 4. Since the rules table now has a rule for a packet that has the five-tuple of F20, the security agent is able to process the packet based on that rule and is not required to send the packet to the security cluster for further processing.

The second stage 520, illustrates that the MFE 425 transmits the packet to the end machine 450. The MFE transmits the packet to this end machine because the destination of the packet originally was the end machine 450 and the security rule for the five-tuple of the packet indicated that the packet should be allowed for transmission. Again, some of the exchanges of the packet between the MFE and the security agent are not shown in this figure for the simplicity of the description. For instance, before the MFE transmits the packet to the end machine 450, the security agent has transmitted the packet to the MFE. This transmission of the packet from the security agent back to the MFE is not shown as a separate stage in order to simplify the illustration as well as the description.

Figure 6:
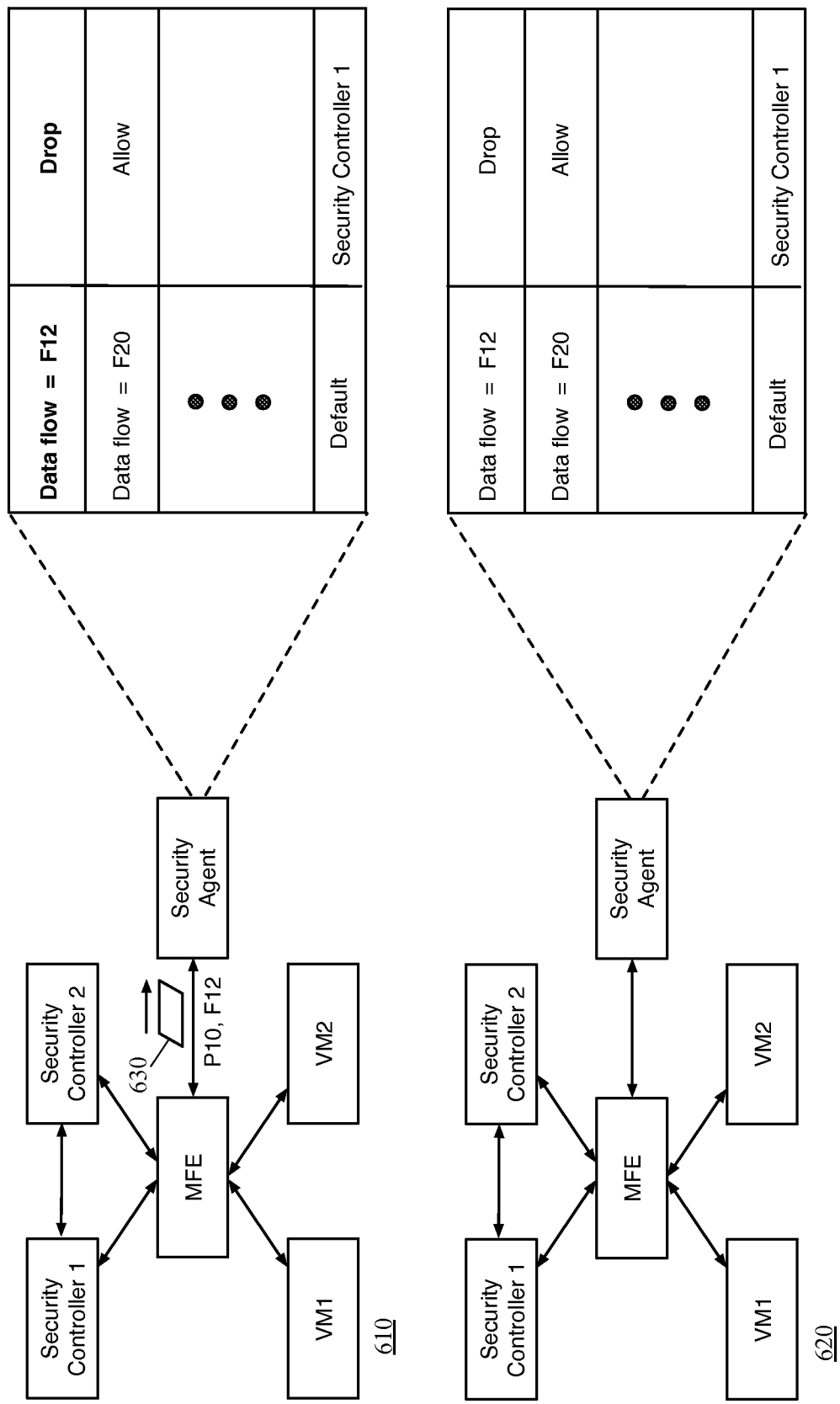
FIG. 6 illustrates an example of the security agent of some embodiments processing the packets according to the security rules of the rules table.

FIG. 6 illustrates another example of the security agent of some embodiments processing packets according to the security rules of the rules table. More specifically, FIG. 6 illustrates, in two separate stages 610 and 620, the security agent processes a packet that it receives based on a security rule that the security agent finds in its rules table. As shown in the first stage 610, the security agent 430 receives a packet 630 from the managed forwarding element 425. This stage also shows that the packet 630 is the 10$^{th}$ packet (P10) of the data flow F12. As illustrated, the rules table has a record 460 (the first record of the table) with a rule for a packet that has the five-tuple of F12. Therefore, the security agent processes the packet locally based on this record and is not required to transmit the packet to the corresponding security controller in the security cluster for further security processing.

The second stage 620, illustrates that the MFE 425 does not transmit the packet to any of the end machines. This is because the security agent finds the rule in the rules table, which states all packets with five-tuple of F12 should be dropped regardless of the destination of the packets. It must be noted that in some embodiments, when the identification field of the rules table includes a more general packet identification information than the identification information of the packet being checked, the rule for that identification field would apply to the packet. For instance, when a record of the rules table indicates that the packets with a particular source IP address should be dropped, the security agent of these embodiments would drop any packet from any data flow that has the particular source IP address.

Conversely, in some such embodiments, when the identification field of the rules table includes a more specific packet identification information than the identification information of the packet being checked, the rule for that identification field would not apply to the packet with more general identification information. For instance, when a record of the rules table indicates that the packets with a particular five-tuple should be dropped, the security agent of these embodiments would not drop other packets that share the same source IP address with the particular five-tuple but have different destination IP address and/or source and destination transport port numbers. Therefore, in the illustrated example, the packet P10 was dropped because its whole five-tuple matched the five-tuple of record 460 (F12) of the rules table.

Figure 7:
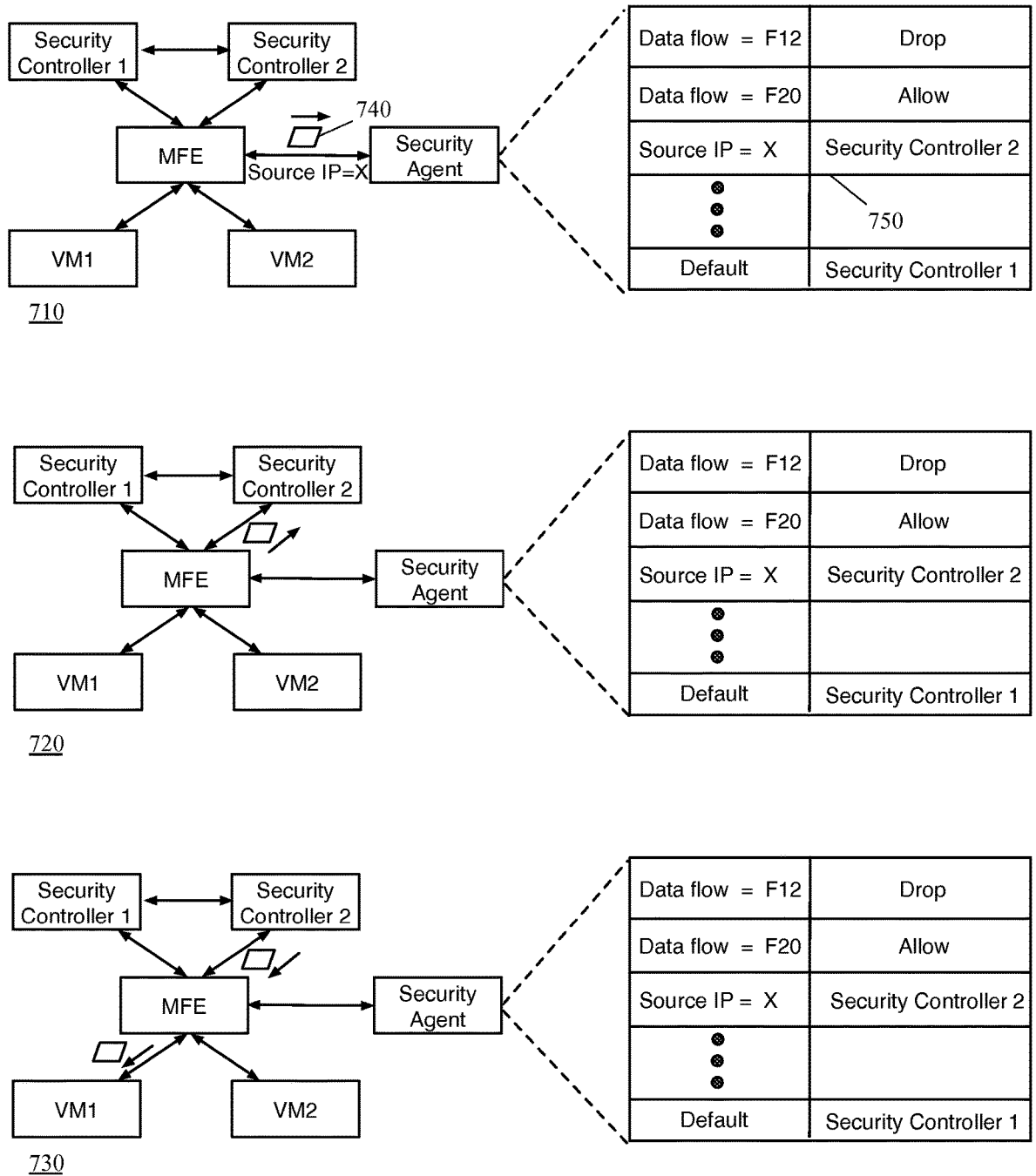
FIG. 7 illustrates a security agent of some embodiments that transmits packets to different security controllers of the security cluster for deep-packet inspection.

FIG. 7 illustrates another example of the security agent of some embodiments processing packets according to the security rules of the rules table. More specifically, FIG. 7 illustrates, in three different stages 710-730, a security agent of some embodiments that transmits a packet to a security controller of the security cluster for deep-packet inspection. As stated above, a deep-packet inspection rule specifies that the packet requires further inspection (i.e., the packet's payload must be inspected in addition to the packet headers). Since deep-packet inspection (e.g., virus detection, spam detection, etc.) requires higher data processing power and storage, the security agent of some embodiments, sends the packets that require DPI to a specific security controller of the security cluster that the rule indicates.

The first stage 710 shows that the security agent 430 receives a packet 740 from the managed forwarding element 425. This packet is a packet that the host machine receives and is destined for the end machine VM1 residing on the host machine. This stage also shows that the packet 740 is a packet that has a source IP address of X. As illustrated in this stage, the rules table has a record 750 (the third record of the rules table) with a rule for packets that have the source IP address of X. However, the illustrated rule tells the security agent to transmit the packet for deep-packet inspection to the security controller 440, which is not the security controller that is assigned as the initial responsible controller for this security agent. Additionally, although the local rules table has a record for the packet, the security agent does not process the packet locally and based on this rule, the security agent should transmit the packet to the corresponding security controller in the security cluster for DPI processing.

The second stage 720 illustrates that the MFE 425 transmits the packet to the security controller 440 of the security cluster. This is because the security agent finds the rule in the rules table that states all packets with the source IP address of X should be sent to the security controller 440 ("Security Controller 2") for deep-packet inspection processing. The deep-packet inspection of some embodiments is performed by a third-party anti-virus application and/or anti-spam application that is configured on a particular security controller such as the controller 440 of the security cluster (e.g., by a network administrator). The third stage 730 shows that the security controller 440 of the security cluster sends the packet back to the MFE to be forwarded towards its destination (i.e., end machine VM1) after deep-packet inspection. This stage also shows that the MFE forwards the packet towards end machine VM1 which was the original destination of the packet. One with ordinary skill in the art realizes that if the DPI processing results in dropping the packet, the security controller of some embodiments would not send the packet back to the MFE or the security agent. The controller of some embodiments, instead, sends an error message (e.g., an Internet Control Message Protocol (ICMP)) back to the security agent to be forwarded to the originator of the packet.

II. Security Cluster

When a security controller receives a packet from a security agent in the network, the security controller determines whether it is the appropriate security controller or whether the packet should be forwarded to a different one of the security controllers in the cluster. To make this determination, the security controller determines whether it has a security rule for the packet. When the packet is the first packet in a flow, and the security controller is the default controller specified to receive the packet, it may not have the security rule for the packet. However, as explained below, for subsequent packets, the correct security controller will have installed a rule on the security agent, which specifies the correct security controller to which to transmit the packet. If the security controller that receives the packet does not have the appropriate security rule, it identifies the correct security controller (by, e.g., generating a hash index for the packet and determining the controller to which the hash index corresponds) and sends the packet to this identified security controller.

When the security controller does have the security rule for the packet, it processes the packet according to the security rule. As mentioned, this may entail performing various types of deep-packet inspection operations that involve examining the packet payload (i.e., past the L4 headers). In some embodiments, the security agents send all packets requiring deep-packet inspection to the specified security controller.

When the packet is the first packet in a data flow (i.e., the first packet to be sent from a particular security agent for processing by a particular security rule), the security controller sends the packet back to the forwarding element with the rule for the local security agent. If no deep-packet inspection is required, the rule simply indicates, e.g., whether to drop or allow the packet at the security agent. In some embodiments, the controller does not send the packet back to the forwarding element if the rule is to drop the packet. In some embodiments, when further processing is required for the security rule, the rule also specifies the correct security controller to which to send further packets. Thus, even if the default controller for a particular local security agent is not the correct controller for a particular packet, subsequent packets in the same flow will be sent to the correct security controller.

In a distributed security system of some embodiments, a security cluster that includes numerous security controllers is configured such that each security controller is responsible to initially provide security service to one or more security agents of one or more host machines. The security cluster of some embodiments receives network security configuration (e.g., from a network administrator) and configures a set of security controllers of the security cluster. The hosting system, in some embodiments, includes multiple computing machines (e.g., host machines) that execute several compute nodes (e.g., virtual machines) for different tenants. The security controllers of some embodiments are controller computers, while in other embodiments, the security controllers are virtual machines that execute on one or more computing machines. In yet other embodiments, the security controllers are security controller instances that operate on one or more physical machines or compute nodes (e.g., end machines residing on one or more host machines).

The security cluster of some embodiments provides a set of application programming interfaces (APIs) to a user (e.g., the hosting system administrator, a tenant network administrator, etc.). The set of APIs is responsible for receiving security configuration data and user queries from the user through a set of API calls and responding to the user queries. In some embodiments the set of APIs is provided to the user through one or more specific API controllers of the security cluster. In some such embodiments, the API controllers also disseminate the received security configuration data to the other security controllers of the security cluster. As such, the API controllers of some embodiments serve as the interface between users and the security cluster. For example, a user might specify (e.g., through an API) that all packets with a source IP address of X should be dropped in a tenant network (e.g., a logical network topology that employs one or more end machines in the hosting system).

As stated above, the configuration data, in some embodiments, specify that for each host machine (specifically, for the security agent on each host machine), a default security controller is assigned. In some embodiments, a default security controller for a particular set of security agents receives packets for which the security agents in the set do not have a stored security rule. When the default security controller receives a packet from one of the security agents of the set, the controller matches the packet against the security rules that are locally stored at the controller (e.g., in the database shard stored on the controller). The default controller of some embodiments identifies the packet that it receives by extracting the packet's identification information from one or more packet headers (e.g., the Internet Protocol (IP) header, the Transmission Control Protocol (TCP) header, etc.). In some embodiments these identification information include any combination of the connection five-tuple of the packet (i.e., source IP address, destination IP address, source transport port number, destination transport port number, and transport protocol). For example, the identification information may include only the source IP of the packet, the destination IP of the packet, or the whole five-tuple of the packet.

The default controller of some embodiments, either finds the required security rule in its stored database, or sends the packet to a second security controller of the security cluster that the default security controller determines as a controller that should have the required rule. When the security controller—either the default security controller or the second security controller—finds a matching rule for the packet, the security controller of some embodiments processes the packet according to the matching security rule, and returns the rule (the record that includes the rule field and the packet identification field) to the requesting host machine (i.e., to the requesting security agent of the host machine). In some such embodiments, if the security controller—either the default security controller or the second security controller—does not find any match for the identified packet, the controller returns a rule-not-found to the requesting host machine. In some embodiments the rule-not-found directs the security agent to drop the packet.

Figure 8:
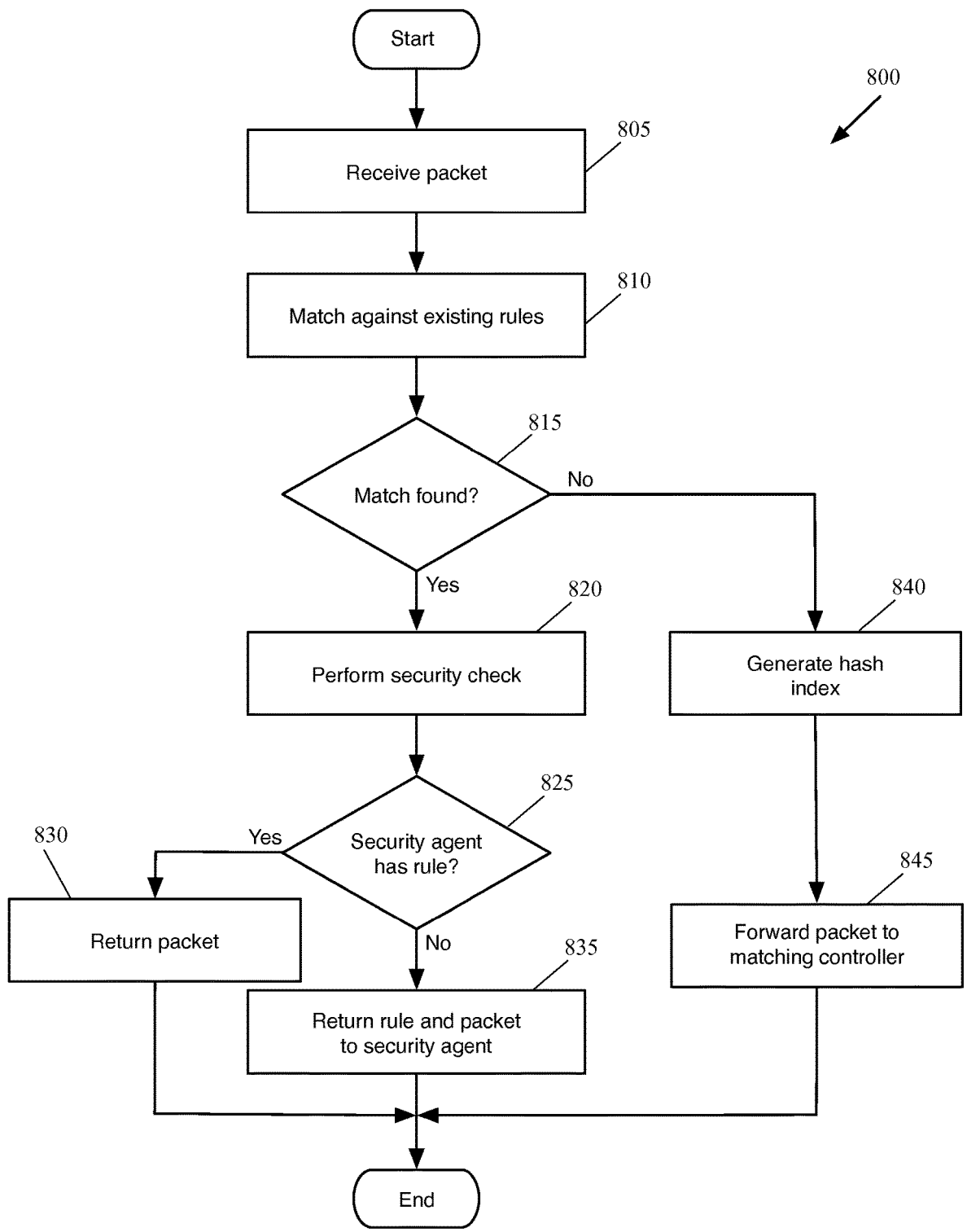
FIG. 8 conceptually illustrates a process of some embodiments that performs security check for a hosting system in a distributed manner.

FIG. 8 conceptually illustrates a process 800 of some embodiments that performs a security check for a hosting system in a distributed manner. In some embodiments the process 800 is performed by any one of the security controllers of the security cluster each time that security controller receives a packet. The process 800 begins by receiving (at 805) a packet on which a security check is required. As stated above, the security controller of some embodiments receives the packet from a security agent that could not find a rule for the packet after identifying the packet. In some embodiments, the security controller receives the packet from another security controller of the security cluster. In some such embodiments, when a first security controller that is responsible for the security agent (i.e., the default security controller), is not able to find a matching identification information for the packet that it receives from the security agent, the default security controller sends the packet to a second security controller that should have a rule for such packet identification information.

After receiving the packet (e.g., form a security agent or another security controller), the process matches (at 810) the packet against the security database shard that is stored at the controller. In some embodiments, similar to a security agent, the process first parses the packet headers in order to identify the packet and then matches the packet against the security rules table of the controller. In other words, the process of some embodiments parses the packet headers by extracting the packet's identification information from one or more packet headers that contain different data for different network layers. For example, the process identifies the five-tuple of the packet by extracting the source and destination IP addresses, the source and destination transport port numbers, and the transport protocol information from the IP header and the TCP header of the packet.

The process then determines (at 815) whether the controller has a record with such packet identification information (e.g. any combination of the five-tuple of the packet). In some embodiments, each controller has a corresponding rules table that each of its records includes at least two fields (columns): an identification field, and a rule field. The identification field contains identification information of different packets belonging to different data flows. The rule field contains the corresponding rule based on which the identified packet should be processed. In order to realize whether there is a corresponding rule for the received packet, the process of some embodiments searches the rules table (i.e., the identification column of the table) for the identification information of the packet (i.e., any combination of the five-tuple of the packet). For example, the identification information may include only the source IP address of the packet, the destination IP address of the packet, or the five-tuple of the packet.

In some embodiments, similar to what is discussed above for the security agents, a particular packet might be identified in multiple records of the rules table of the controller. When there are multiple records in the rules table that contain different combinations of the five-tuple of the same packet, a record that has a more general identification value for the packet in the packet identification field would be assigned a higher priority over other records that identify the same packet. That is, in some embodiments, the record that has a packet identification field with only one of the five-tuple of the packet has a higher priority than another record that contains two or more of the five-tuple of the packet in the packet identification field. In some other embodiments, however, when there are multiple records in the rules table that identify the same packet, a record that has a more specific identification value for a packet in the packet identification field would be assigned a higher priority over other records that identify the same packet. That is, the record that has a packet identification field with a combination of maximum number of the five-tuple has a higher priority than a record with a less number of the five-tuple of the packet in the packet identification field.

When the process 800 finds a match (at 815) for the packet identification information, the process performs (at 820) a security check based on the rule that is associated with the identified packet. As discussed above, the rules of some embodiments include allow the packet, drop the packet, block the packet, and perform deep-packet inspection (DPI). In some embodiments when the controller drops the packet, the controller does not return any thing to the requesting security agent. The controller of some embodiments sends a message (e.g., an Internet Control Message Protocol (ICMP)) back to the security agent when the security rule is to block the packet. The controller returns the message so the message could be forwarder to the originator of the packet. In some embodiments, when the security rule is to allow the packet, the process returns the packet to the security agent to be forwarded to its destination. The controller of some embodiments also returns the packet to the security agent when the controller performs a DPI on the packet and the result of the DPI is to allow the packet to continue on its route towards the destination.

After performing the necessary security check, the process of some embodiments determines (at 825), whether the rule has been previously sent to the security agent. The process of some embodiments makes such a determination when the process has performed a deep-packet inspection on the packet. When the process determines that the security agent has the rule (which means the packet was processed for DPI), the process returns (at 830) the packet to the security agent. The process then ends. When the process determines that the rule has never been sent to the security agent, the process sends (at 835) the rule (i.e., the record that contains the packet identification field and the rule field) back to the security agent to be stored in the security agent (i.e., in the rules table associated with the security agent). Additionally, depending on the rule, the process may or may not send the packet back to the security agent. The process then ends.

When the process does not find a match (at 815), the process generates (at 840) a hash index using a hash function of the hashing system that was originally deployed by the process in sharding the security rules. For instance, the process of some embodiments generates the hash index by computing the result of the hash value (of the data stored in the packet identification field) modulo the number of security controllers. This result (of the modulo operation) will be an integer that corresponds to one of the security controllers in the cluster.

After determining which security controller should have the security rule (based on the generated index), the controller of some embodiments sends (at 845) the packet to the indexed controller and ends. In some embodiments, the indexed security controller (i.e., the controller that receives the packet) then determines whether the identified packet matches any of the records in the security database shard stored at the indexed security controller. That is, the controller determines whether the packet identification information is found in the rules table stored on the controller. If a rule is found for the identified packet, the indexed controller processes the packet according to steps 820-835. Otherwise, the controller sends a rule-not-found message to the requesting security agent.

In some embodiments, the security agent is configured in such a way that when it receives a rule-not-found from the controller, the agent stores a rule to drop the packets that have the corresponding identification information in the rules table of the security agent. In this manner, any following packet with the same identification information would be dropped at the security agent instead of being sent to the security cluster for further processing. In yet other embodiments, each time that the security agent does not find a rule for a packet, the security agent sends the packet to the security cluster because the security configuration data might have been updated by the user and now the cluster might have the rule for the packet.

Some embodiments perform variations of the process 800. The specific operations of the process 800 may not be performed in the exact order shown and described. For example, the process of some embodiments does not make a determination (at 825) whether the security agent has the rule or not. For example, in some embodiments, the process first determines whether the rule is a DPI rule. After the process determines that the security rule performed on the packet was a DPI rule, the process determines whether the security agent has the rule. If the process determines that the rule was not a DPI rule, the process sends the rule back to the security agent because in such a situation, the security agent does not have the rule. As another example, in some embodiments when the security check is a DPI at 825 and the result of the DPI is to drop the packet, the process does not return (at 855) the packet back to the security agent. Additionally, the specific operations may not be performed in one continuous series of operations, and different specific operations may be performed in different embodiments.

Figure 9:
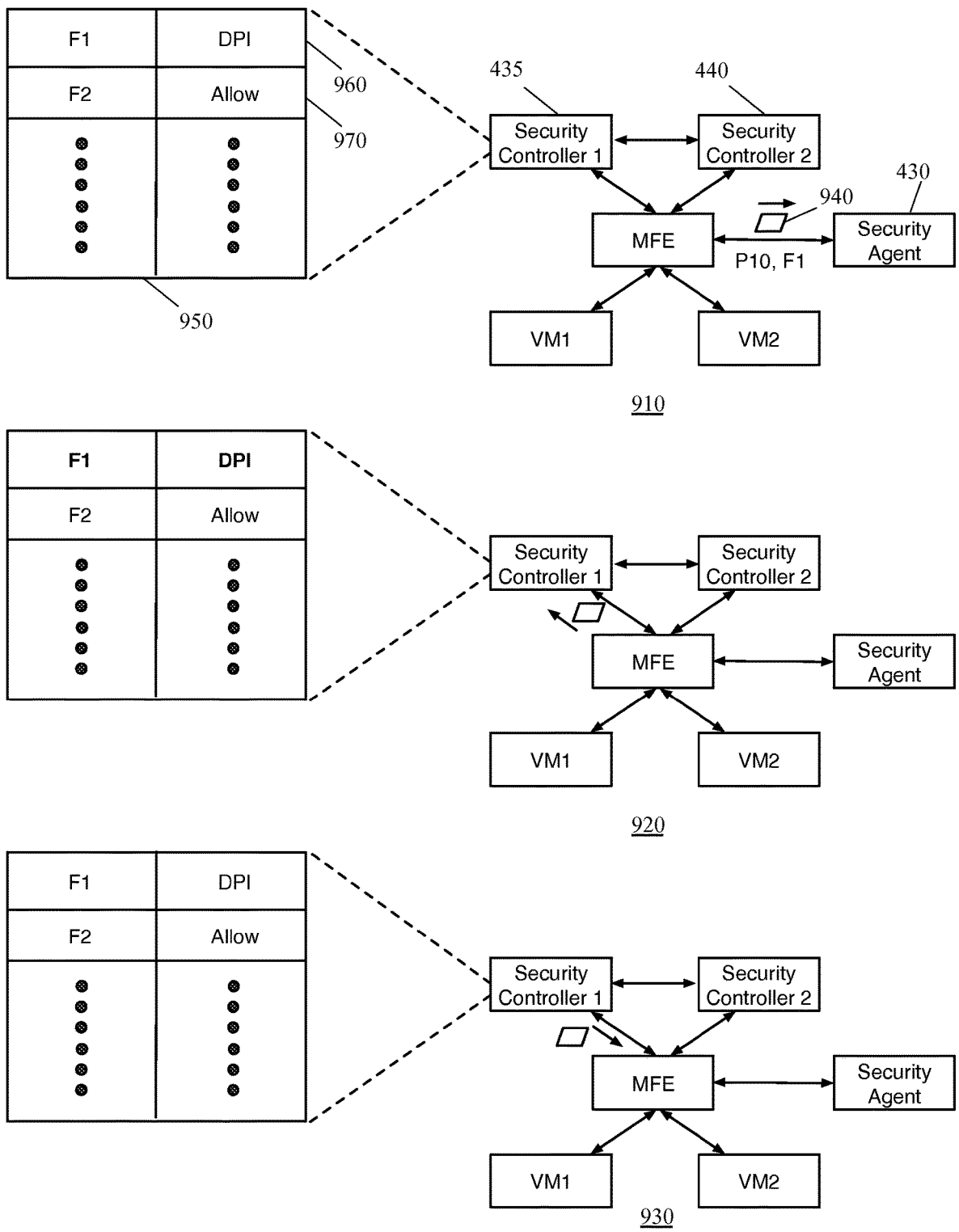
FIG. 9 illustrates an example of the security controller processing the packets received from a security agent according to the security rules stored in the controller.

FIG. 9 illustrates an example of the security controller of some embodiments processing the packets received from a security agent according to the security rules stored in the controller. More specifically, FIG. 9 illustrates, in three different stages 910-930, a security controller of some embodiments that receives a packet from a security agent of a host machine and processes the packet according to a security rule stored in a data storage (e.g., a rules table) of the controller. In some embodiments, the data storage of a security controller is similar to the rules table of the security agent. That is, the rules table of a security controller includes at least two columns (fields): an identification column, and a rule column. The identification field contains identification information of different packets belonging to different data flows. The rule field contains the corresponding rule for each identification field based on which the identified packet should be processed.

The first stage 910 shows that the security controller 435 receives a packet 940 from the managed forwarding element 425. This stage also shows that the packet 940 is the 10$^{th}$ packet (P10) of the data flow F1. Therefore, although the packet belongs to a data flow that has been previously processed by the security agent (i.e., the packet is not the first packet of the data flow), the security agent still sends the packet to the security controller for further processing. This is because a rule corresponding to the packets of this particular data flow directs the security agent to forward the packets to the security controller 435. As illustrated in this stage, the rules table 950 of the security controller includes multiple records that contain security rules for packets of different data flows. For example, the rules table 950 has a record 960, among other records, that states all the packets belonging to data flow F1 must be DPI processed. Another record 970 of the rules table of the controller states that all packets that belong to the data flow F2 must be allowed.

The second stage 920 illustrates that the MFE 425 transmits the packet to the security controller 435 of the security cluster. The security agent does so because the security agent finds the rule in the rules table, which states all packets that belong to data flow F1 should be sent to the security controller 435 ("Security Controller 1") for deep-packet inspection. The deep-packet inspection of some embodiments could be performed by a third-party anti-virus application and/or anti-spam application that is configured on a particular security controller such as the controller 435 of the security cluster (e.g., by a network administrator). The third stage 930 shows that the security controller 435 of the security cluster sends the packet back to the MFE to be forwarded towards its destination after deep-packet inspection. One with ordinary skill in the art realizes that if the deep-packet inspection results in dropping the packet, the controller would not send the packet back to the MFE or the security agent. The controller of some embodiments, instead, sends an error message (e.g., an Internet Control Message Protocol (ICMP)) to be forwarded to the originator of the packet.

Figure 10:
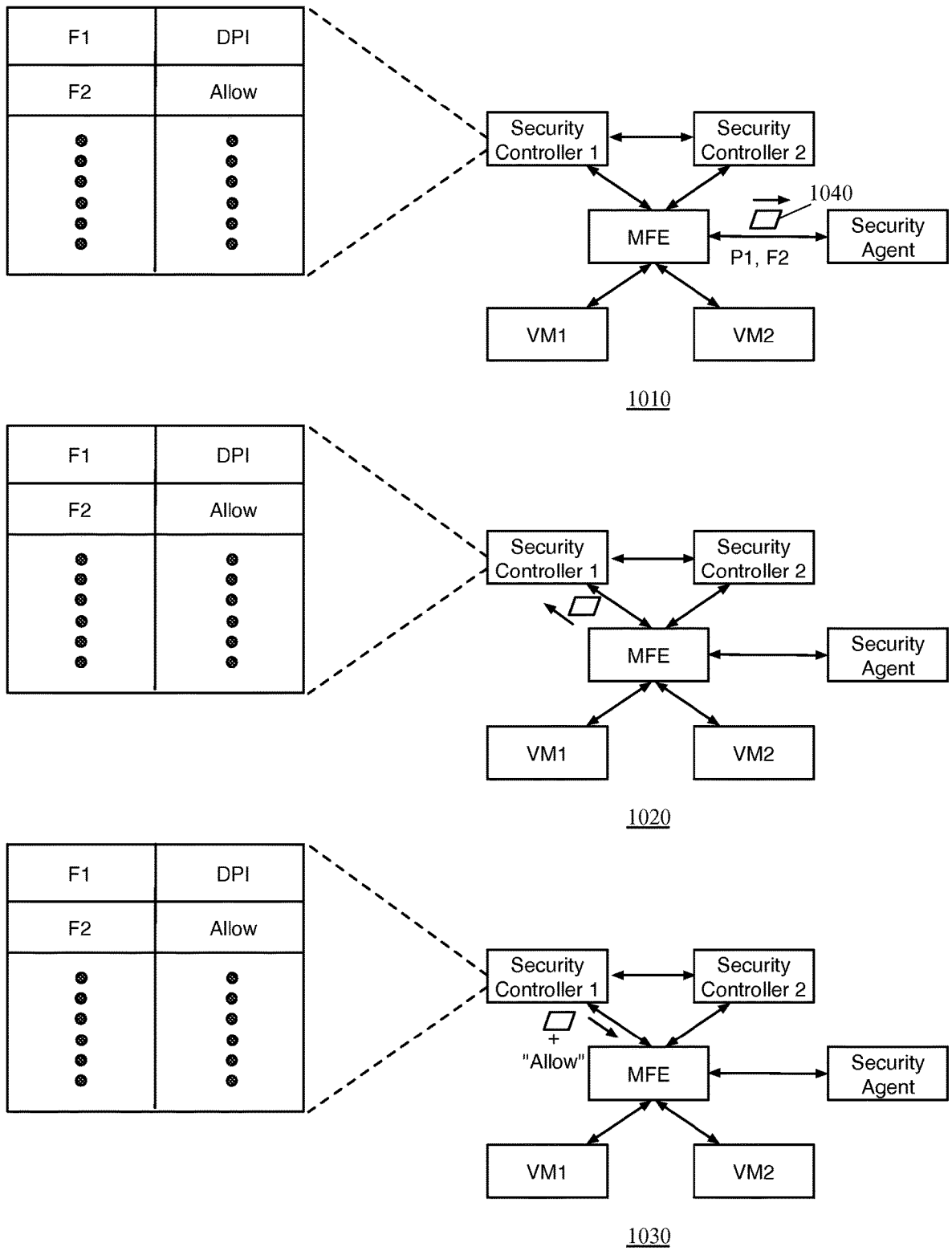
FIG. 10 illustrates another example of the security controller of some embodiments processing the packets received from an associated security agent.

FIG. 10 illustrates another example of the security controller of some embodiments that processes the packets received from an associated security agent. More specifically, FIG. 10 illustrates, in three separate stages 1010-1030, a security controller of some embodiments that receives a packet from a security agent of a host machine and processes the packet according to a security rule stored in a data storage (e.g., a rules table) of the controller.

The first stage 1010 shows that the security controller 435 receives a packet 1040 from the managed forwarding element 425. This stage also shows that the packet 1040 is the 1$^{st}$ packet (P1) of the data flow F2. Since the packet is the first packet of the data flow F2 and the security agent has not processed any packets with at least some combination of the five-tuple related to the data flow F2, the security agent sends the packet to the security controller for further processing. As illustrated in this stage, the rules table 950 of the security controller includes a record 970 (the second record of the table) that states all packets belonging to data flow F2 must be allowed.

The second stage 1020 illustrates that the MFE 425 transmits the packet to the security controller 435 of the security cluster. This is because the security agent has not found any rule in the rules table for the identified packet. The third stage 1030 shows that the security controller 435 of the security cluster has processed the packet based on the security rule it has found for the packet (i.e., "Allow"). This stage also shows that the security controller sends the packet back to the MFE along with the security rule found for the identified packet. As stated above, when the controller determines that the security agent does not have a record for the packet the security controller has processed, the security controller of some embodiments sends the record that includes the rule back to the security agent. The security agent then stores the record in its corresponding rules table so the next packets with the same characteristic would be processed according to the stored rule.

Figure 11A:
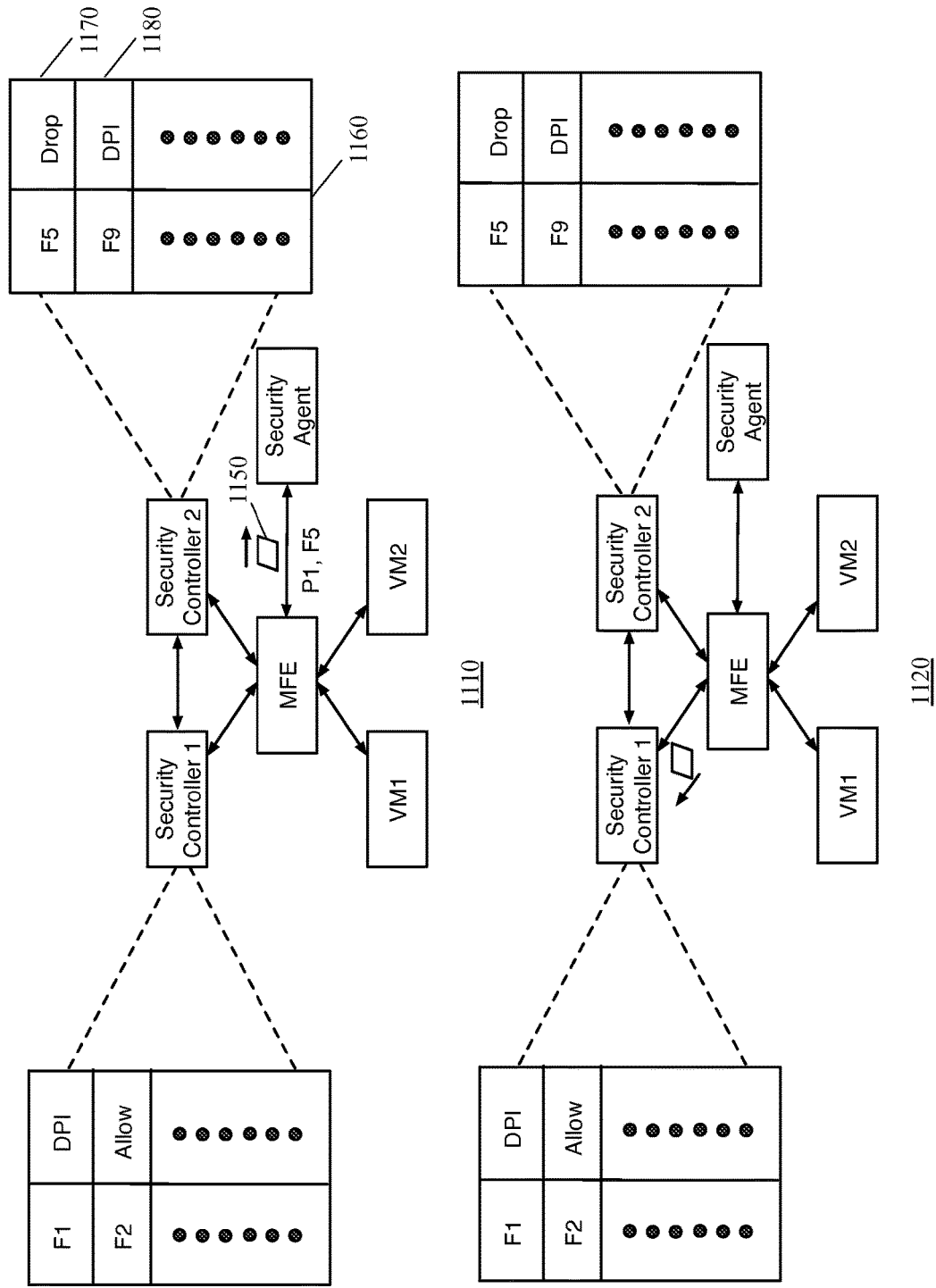
FIGS. 11A-11B illustrate a security controller of some embodiments that receives a packet from a security agent of a host machine for which the security controller does not have a security rule stored in its rules table.
Figure 11B:
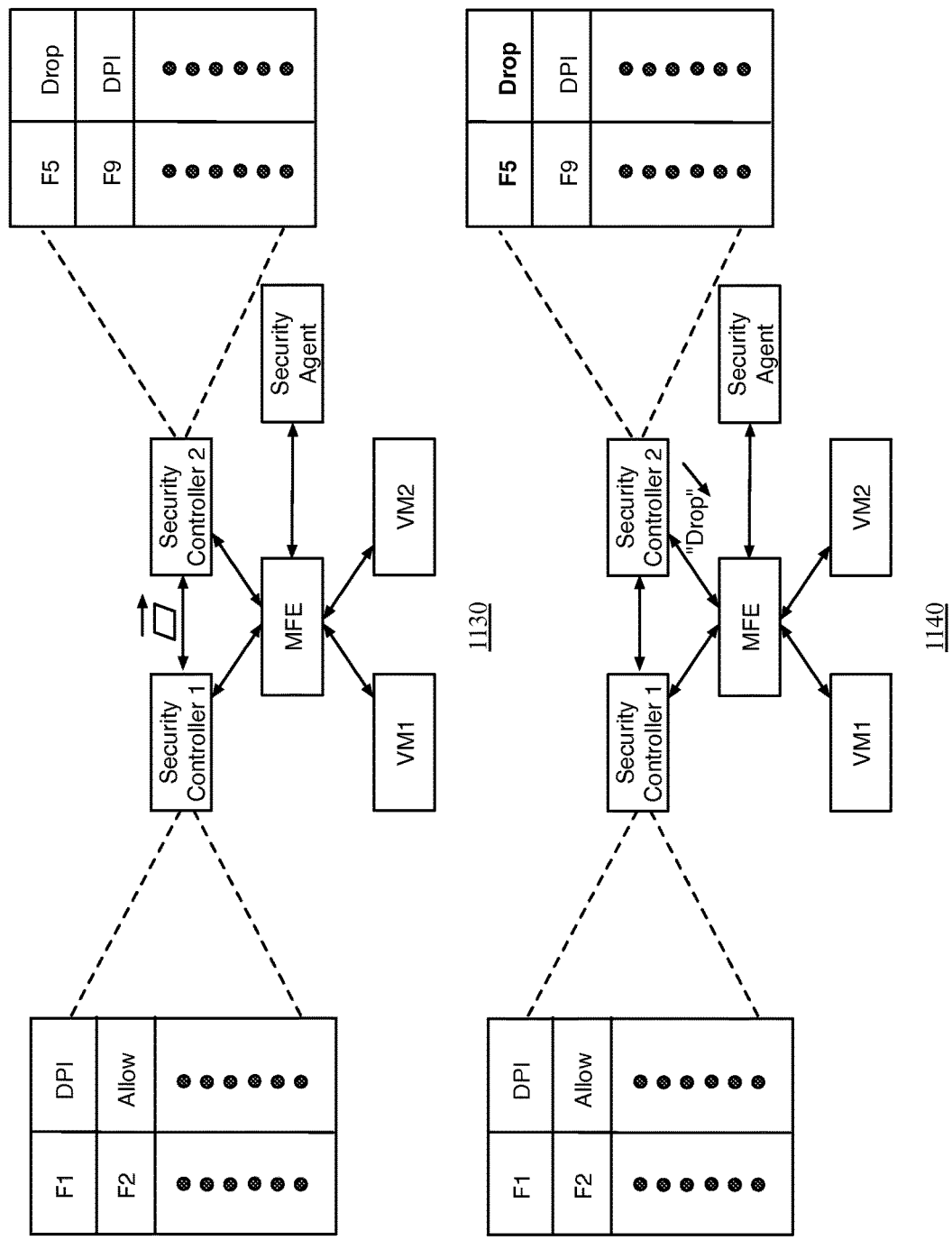

FIGS. 11A-11B illustrate another example of the security controller of some embodiments processing the packets received from an associated security agent. More specifically, FIGS. 11A-11B illustrate, in four separate stages 1110-1140, a security controller of some embodiments that receives a packet from a security agent of a host machine for which the security controller does not have a security rule stored in its rules table.

The first stage 1110 shows that the security controller 435 receives a packet 1150 from the managed forwarding element 425. This stage also shows that the packet 1150 is the $1^{st}$ packet (P1) of the data flow F5. Since the packet is the first packet of the data flow F5 and the security agent has not processed any packets with at least some combination of the five-tuple related to the data flow F5, the security agent sends the packet to the security controller for further processing. The second stage 1120 illustrates that the MFE 425 transmits the packet to the security controller 435 of the security cluster. This is because the security agent has not found any rule in the rules table for the identified packet and therefore sends the packet to the security controller 435 that it determines as a security controller that should have a security rule for the packet. In some embodiments, as described above, the controller makes such a determination by generating a hash index using a hash function of the hashing system that is used in sharding the security rules. The controller of some embodiments generates the hash index by computing the result of the hash value (of the data stored in the packet identification field) modulo the number of security controllers. In the illustrated example, the generated hash index indicates that the security controller 435 should have a security rule for the identified packet.

As illustrated in the third stage 1130, the rules table 950 of the security controller does not include ant record that has at least one combination of the five-tuple of the data flow F5. As stated above, when the controller determines that it doesn't have a rule for the identified packet, the controller of some embodiments generates a hash index using a has function of the hashing system deployed by the process, in order to determine what other controller of the security cluster has a match for the identified packet. That is, the security controller of some embodiments determines whether the packet identification information is found in any other security database shards storing on other controllers of the security cluster. When the security controller finds a match, the controller forwards the packet to the identified controller. The third stage also shows that the security controller 435 has found a security controller 440 as the controller that has a rule for the identified packet. Therefore, the security controller 435 of the security cluster sends the packet to the security controller 440 of the security cluster for further processing.

The fourth stage 1140 shows that the rules table 1160 of the security controller 440 includes a record 1170 among other records that states all the packets belonging to data flow F5 must be dropped. Another record 11800 of the rules table of this controller states that all packets belonging to data flow F9 must be deep-packet inspected. When the security controller 440 receives the packet from the security controller 435, it searches its database for a record that has the identification information of the packet. In the illustrated example, the controller finds the record 1170 (the first record of the table) that has a security rule for the packet. As indicated, the record states that all packets that belong to the data flow F5 must be dropped. As such, the controller drops the packet. Additionally, the controller only sends the rule (i.e., the record that contains the rule and the packet identification fields) back to the security agent for the security agent to store the record in its corresponding rules table. As such, The security agent would drop any subsequent packet that belongs to the same data flow (F5) and is not required to send the packet to the security cluster for further processing.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
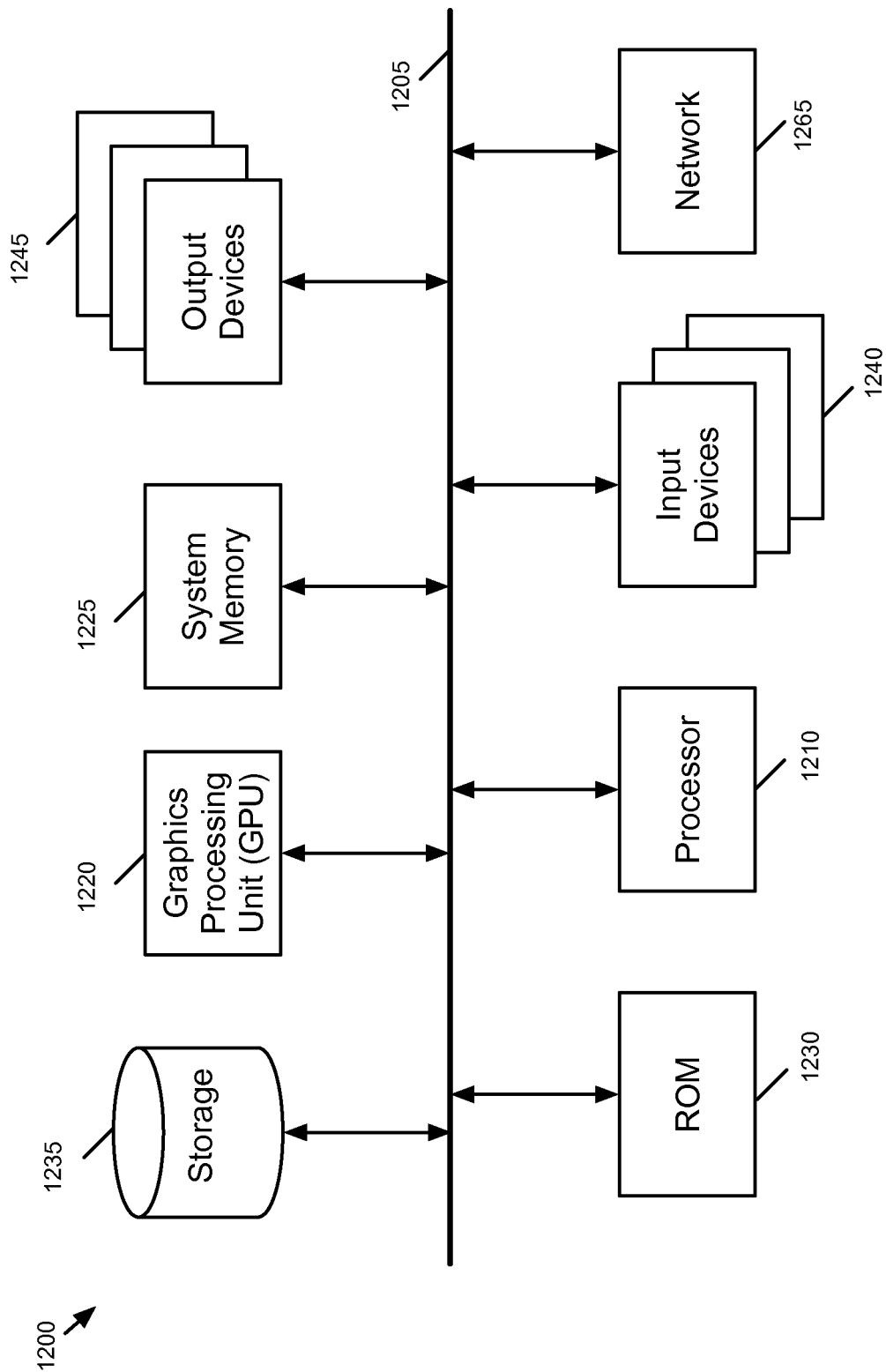
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash memory device, etc., and its corresponding drive) as the permanent storage device. Like the permanent storage device 1235, the system memory 1225 is a read-and-write memory device. However, unlike storage device 1235, the system memory 1225 is a volatile read-and-write memory, such a random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a datacenter comprising host computers, a method for configuring a security cluster comprising (i) security agents executing on a set of host computers, and (ii) security controllers, the method comprising:

for each of a plurality of security agents executing on a plurality of computers, configuring the security agent (i) to perform security operations on received packets when the security agent has a security rule associated with the received packets, and (ii) to pass received packets to a security controller for performing security operations when the security agent does not store any security rule associated with the received packets;

for each of a plurality of security controllers, configuring the security controller (i) to perform security operations on packets received from security agents when the security controller has security rules associated with the received packets and (iii) to pass received packets to a not her security controller for performing security operations when the security controller does not store any security rule associated with the received packets; and wherein configuring each of the security controllers comprises configuring at least one security controller to return the packets to the host computers on which the packets' originating security agents execute when the stored security rules do not require the packets to be dropped.

2. A non-transitory machine readable medium storing a program for configuring security controllers and security agents in a datacenter comprising host computers, the security agents executing on a set of host computers, the program comprising sets of instructions for:

for each of a plurality of security agents executing on a plurality of computers, configuring the security agent (i) to perform security operations on received packets when the security agent has a security rule associated with the received packets, and (ii) to pass received packets to a security controller for performing security operations when the security agent does not store any security rule associated with the received packets;

for each of a plurality of security controllers, configuring the security controller (i) to perform security operations on packets received from security agents when the security controller has security rules associated with the received packets, and (iii) to pass received packets to another security controller for performing security operations when the security controller does not store any security rule associated with the received packets; and wherein the set of instructions for configuring each of the security controllers comprises a set of instructions for configuring at least one security controller to return the packets to the host computers on which the packets' originating security agents execute when the stored security rules do not require the packets to be dropped.

* * * * *